United States Patent [19]

Ishikawa et al.

[11] Patent Number: 4,953,196
[45] Date of Patent: Aug. 28, 1990

[54] IMAGE TRANSMISSION SYSTEM

[75] Inventors: Yasunori Ishikawa, Kawasaki; Noboru Murayama, Machida; Koichi Suzuki, Yokohama; Koji Kuwata, Yokohama; Hiroshi Shimura, Yokohama; Masaaki Ishikawa, Yokohama, all of Japan

[73] Assignee: Ricoh Company, Ltd., Japan

[21] Appl. No.: 192,648

[22] Filed: May 11, 1988

[30] Foreign Application Priority Data

| May 13, 1987 | [JP] | Japan | 62-116236 |
|---|---|---|---|
| May 13, 1987 | [JP] | Japan | 62-116237 |
| May 26, 1987 | [JP] | Japan | 62-127025 |
| May 29, 1987 | [JP] | Japan | 62-131360 |
| Jun. 30, 1987 | [JP] | Japan | 62-163694 |

[51] Int. Cl.$^5$ .................. H04M 11/00; H04N 7/14
[52] U.S. Cl. ............................. 379/53; 358/85; 358/134
[58] Field of Search .......... 379/53, 54; 358/85, 358/13, 134

[56] References Cited

U.S. PATENT DOCUMENTS

| 3,564,127 | 2/1971 | Sziklai et al. | 178/6 |
|---|---|---|---|
| 3,842,199 | 10/1974 | Gibson | 358/85 |
| 4,057,836 | 11/1987 | Munsey | 358/134 |
| 4,099,202 | 7/1978 | Cavanaugh | 358/85 |
| 4,258,387 | 3/1981 | Lemelson et al. | 358/85 |
| 4,516,151 | 5/1985 | Stahler | 358/85 |
| 4,560,833 | 12/1985 | Weber et al. | 358/85 |
| 4,561,020 | 12/1985 | Matsuda | 358/134 |
| 4,715,059 | 12/1987 | Cooper-Hart et al. | 379/53 |
| 4,802,003 | 1/1989 | Takei et al. | 358/13 |
| 4,816,901 | 3/1989 | Music et al. | 358/85 |

FOREIGN PATENT DOCUMENTS

| 0010813 | 5/1980 | European Pat. Off. |  |
|---|---|---|---|
| 2030419 | 4/1980 | United Kingdom . |  |
| 1568378 | 5/1980 | United Kingdom . |  |
| 2148653 | 5/1985 | United Kingdom | 358/85 |
| 2158673 | 11/1985 | United Kingdom | 358/85 |
| 2173675 | 10/1986 | United Kingdom | 379/53 |
| 2191907 | 12/1987 | United Kingdom . |  |
| 2206465 | 1/1989 | United Kingdom . |  |

OTHER PUBLICATIONS

NEC, "64 kB TV Telephone", 4/24/89.
H. Schonfelder, "To a Concept of a Color Videophone System", Nachrichtentechnische Zeitschrift NTZ, vol. 30, No. 2, pp. 163-168, Feb. 1977.

Primary Examiner—Jin F. Ng
Assistant Examiner—Wing F. Chan
Attorney, Agent, or Firm—Mason, Fenwick & Lawrence

[57] ABSTRACT

A video phone comprising an input device for entering input image data to be transmitted, a circuit for digitizing the input image data into digital image data, a memory for storing the digital image data, a first circuit for producing an output image signal based on the digital image data from the memory, a display device for displaying an image of the output image signal, a second circuit for compressing the digital image data from the memory into compressed image data, a telephone part having telephone functions, a line control circuit coupled to a public analog telephone line for selectively coupling the second circuit and the telephone part to the public analog telephone line, and a control device. The control device controls at least the memory and the second circuit so that the compressed image data related to the input image data is read out from the memory and supplied simultaneously to the first and second circuits in an image transmitting mode and the compressed image data related to a voice frequency signal received through the public analog telephone line is stored in the memory and read out therefrom to be supplied to the first circuit in an image receiving mode.

18 Claims, 17 Drawing Sheets

IMAGE TRANSMISSION SYSTEM

BACKGROUND OF THE INVENTION

The present invention generally relates to image transmission systems, and more particularly to an image transmission system suitable for use in a video phone, a facsimile machine and the like.

Various video phone systems have been proposed in the past. The video phone was developed mainly in the United States around 1950 to 1970 and experimental results on various systems were announced, but none were reduced to practice. The fundamental problems of the proposed video phone were that the system required a wide band video line exclusively for image transmission. However, the need for setting up the wide band video line exclusively for the video phone made it impractical costwise.

Coming into the 1980's, it has now become possible to reduce into practice a digital data line capable of data transmission at a transmission rate in the order of 56 bps to 64 bps. And, new image transmission systems have been proposed by combining such a digital data line with advanced digital image data compression techniques. But still, such new image transmission systems have not been reduced to practice since the digital data line above described has yet to come into wide use.

There are also image transmission systems which transmit a still picture on a public analog telephone line by using the digital image data compression technique. However, these systems take a long time to transmit the still picture. For example, it takes several tens of seconds to several minutes to transmit one still picture. Accordingly, these systems are not of much use in a personal video phone from the practical point of view.

There is a personal video phone employing a system which transmits one still picture within a few seconds by sacrificing the picture size and picture quality, that is, greatly reducing the quantity of transmitting image data. But this system is restricted to the transmission of a black-and-white picture.

In order to transmit image data related to a color picture, the quantity of the transmitting image data becomes extremely large and it inevitably takes a long time to transmit the image data. As a result, it is extremely difficult to realize an inexpensive personal video phone which can transmit the image data related to the color picture quickly without greatly deteriorating the picture quality.

When transmitting a still picture or a picture having negligibly small movements therein from a video phone, a facsimile machine and the like, a differential pulse code modulation (hereinafter simply referred to as a DPCM) or a delta modulation is usually used for efficiency. The still picture may be a page of a book, a scenery, a portrait and the like.

The DPCM is a predictive coding as is well known, and uses a correlation between picture element data or line data. In other words, the DPCM predicts by use of this correlation a value of a present picture element data from a value of a picture element data which is already encoded, and encodes a difference between the predicted value with an actual value. A difference signal is pulse code modulated into three to four bits.

On the other hand, the delta modulation approximates a signal waveform by a staircase wave having an amplitude which varies by $\pm \Delta$, and obtains one step of the staircase wave as a binary code. Hence, the delta modulation essentially quantizes the difference signal in the DPCM into one bit. According to the delta modulation, the quantization step size (width) is constant with respect to a change in the data.

When the DPCM is used for an image data compression system to separate color image data related to a relatively small picture into a luminance signal and color difference signals, independently encode the luminance signal and the color difference signals and transmit the encoded data on the public line, the picture quality of the transmitted image data is satisfactory but the data compression rate is insufficient. As a result, the data transmission cannot be completed within a short time.

The data compression rate is sufficient when the delta modulation is used for the image data compression system, but noise becomes conspicuous with respect to the luminance signal, and it is impossible to obtain a satisfactory picture quality from the transmitted image data.

On the other hand, a delta modulation with adaptive control (hereinafter simply referred to as adaptive delta modulation) can also be used for transmitting a still picture. The adaptive delta modulation uses the fact that the difference between mutually adjacent samples becomes small as the sampling frequency becomes high, and encodes the difference signal into one bit by carrying out the sampling at a high frequency. When encoding the difference signal into one bit, the quantization step size is determined from past transmission pulse train. In other words, when pulses of the same polarity are repeated, the quantization step size is increased so as to follow a large difference between the mutually adjacent samples. On the other hand, the quantization step size is decreased to suppress the quantization noise when pulses of different polarities occur. Hence, according to the adaptive delta modulation, the quantization step size varies with a predetermined rate with respect to a change in the data.

However, because 50% or more picture element data out of the total picture element data constituting a still picture usually have no change in the tone. For this reason, the tone of a reproduced picture becomes unstable when the delta modulation or the adaptive delta modulation is used. To the human eye, it is a large tone change in the still picture that has a large effect visually.

SUMMARY OF THE INVENTION

Accordingly, it is a general object of the present invention to provide a novel and useful image transmission system in which the problems described heretofore are eliminated.

Another and more specific object of the present invention is to provide a video phone comprising input means for sequentially entering image data, digitizing means for digitizing the input image data into digital image data, memory means for sequentially storing the digital image data, image signal producing means for producing an output image signal based on the digital image data sequentially read out from the memory means, display means for sequentially displaying an image described by the output image signal, compression and expansion means for compressing the digital image data read out from the memory means into compressed image data, telephone means having telephone functions for transmitting and receiving a call, line control means coupled to a public analog telephone line for selectively coupling one of the compression and expansion means and the telephone means to the public analog telephone line, where the line control means includes modem means for modulating the compressed image data from the compression and expansion means into a voice frequency signal and for demodulating a voice frequency signal received through the public analog telephone line into compressed image data, and control means for controlling at least the memory means and the compression and expansion means. The control means has means for freezing the image displayed on the display means at an arbitrary time by stopping the sequential storage of the digital image data into the memory means so that the compressed image data related to a frozen image is read out from the memory means and supplied simultaneously to the image signal producing means and the compression and expansion means in an image transmitting mode. In addition, the control means controls the memory means in an image receiving mode so that the compressed image data related to the voice frequency signal received through the public analog telephone line is stored in the memory means and read out therefrom to be supplied to the image signal producing means. According to the video phone of the present invention, it is possible to transmit and receive an image having a satisfactory picture quality on the public analog telephone line within a short time by use of an inexpensive circuit.

Still another object of the present invention is to provide a video phone which is further provided with means for enabling and disabling a monitoring of the image displayed on the display means. According to the video phone of the present invention, it is possible to freely refuse to see an image which is received on the public analog telephone line.

A further object of the present invention is to provide a video phone in which the compression and expansion means during a compression modulates a luminance signal according to a first modulation system and modulates at least one of two kinds of color difference signals according to a second modulation system which is different from the first modulation system, where the luminance signal and the two kinds of color difference signals are obtained by converting the input image data. The two kinds of color difference signals may be thinned out before the modulation thereof. According to the video phone of the present invention, it is possible to transmit a color still picture at a low transmission bit rate.

Another object of the present invention is to provide a video phone which has a simulation mode for simulating on the display means a display of the input image data as viewed on a receiving end of the public analog telephone line. According to the video phone of the present invention, the user can check how the receiving end will actually view the transmitted image.

Still another object of the present invention is to provide a video phone which is further provided with means for selectively displaying one of a normal image and a mirror image of the input image data. According to the video phone of the present invention, it is easy for the user to check the image which is transmitted, especially when sending a portrait of himself, because people are used to attending to their personal appearance by looking at a mirror image on a mirror.

A further object of the present invention is to provide an image transmission system for transmitting an input color image data in a compressed and encoded form comprising first converting means for converting the input color image data into a luminance signal and two kinds of color difference signals, first modulator means for modulating the luminance signal into a modulated luminance signal, and second modulator means for independently modulating the two kinds of color difference signals into two kinds of modulated color difference signals. The second modulator means modulates at least one of the two kinds of color difference signals according to a second modulation system different from a first modulation system used by the first modulator means. The modulated luminance signal and the two kinds of modulated color difference signals are transmitted as the input color image data in the compressed and encoded form. According to the image transmission system of the present invention, it is possible to transmit a color still picture at a low transmission bit rate and within a short period of time.

Another object of the present invention is to provide an image transmission system in which the second modulator means uses an advanced adaptive delta modulation as the second modulation system, where the advanced adaptive delta modulation has three modes of describing whether a first of two successive samples is greater than, equal to or smaller than a second of the two successive samples of one of the two kinds of color difference signals. According to the image transmission system of the present invention, it is possible to transmit a color still picture having a satisfactory picture quality, even when the two kinds of color difference signals are thinned out before the modulation thereof.

Still another object of the present invention is to provide an image transmission system for transmitting an input image data in a compressed form comprising density buffer means for outputting a buffer value, adder means, subtracting means for subtracting the output buffer value of the density buffer means from an input density value of the input image data to output a resulting difference value DF, first threshold output means for outputting a threshold value T, comparator means for comparing the difference value DF and the threshold value T and for producing an output signal of a first logic level when the difference value DF is greater than the threshold value T, an output signal of a second logic level when the difference value DF is smaller than $-T$ which is complementary to the threshold value T, and an output signal of a logic level different from a logic level of an immediately preceding output signal when the difference value DF is less than or equal to the threshold value T and is greater than or equal to $-T$, second threshold output means for outputting a threshold value Ta, first counter means for counting a number of first logic levels of the output signal of the comparator means, and second counter means for counting a number of second logic levels of the output signal of the comparator means. The first and second counter means output counted values thereof which determine the threshold value T to be read out from the first threshold output means and the threshold value Ta to be read out from the second threshold output means. The first counter means is reset to zero when the second counter means receives the output signal of the comparator means having the second logic level, and the second counter means is reset to zero when the first counter means receives the output signal of the comparator having the first logic level. The second threshold output means outputs the threshold value Ta to the adder means to be added to the output buffer value of the density buffer means. The threshold value Ta read out from the second threshold output means is equal to zero when the counted value of one of the first and second counter means is zero and the counted value of the other of the first and second counter means is one. The output signal of the comparator means is outputted as the input image data in the compressed form. According to the image transmission system of the present invention, it is possible to transmit image data at a low transmission bit rate and still ensure reproduction of a picture having a satisfactory picture quality.

Other objects and further features of the present invention will be apparent from the following detailed description when read in conjunction with the accompanying drawings.

DETAILED DESCRIPTION

Figure 1:
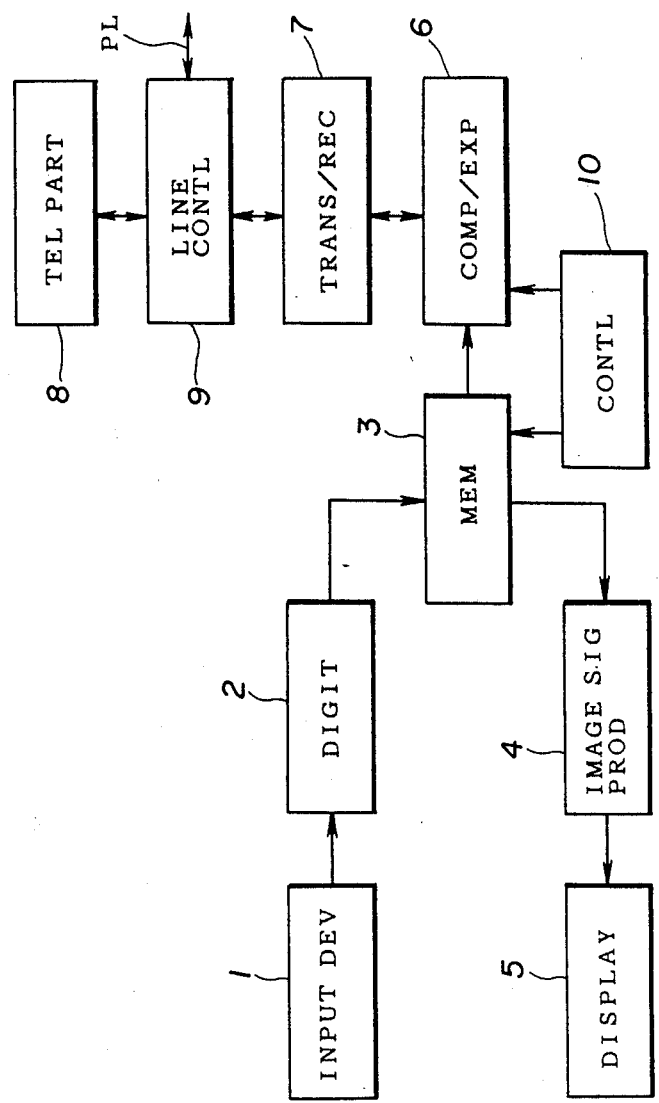
FIG. 1 is a system block diagram generally showing a first embodiment of the image transmission system according to the present invention applied to a video phone.

First, a description will be given on a first embodiment of the image transmission system according to the present invention applied to a video phone. FIG. 1 generally shows a block system of the video phone applied with the first embodiment. The video phone comprises an input device 1, a digitizing circuit 2, a memory 3, an image signal producing circuit 4, a display device 5, a compression and expansion circuit 6, a transmitting and receiving circuit 7, a telephone part 8, a line control circuit 9, and a control device 10.

The telephone part 8 has the functions of an ordinary telephone, and this telephone part 8 and the transmitting and receiving circuit 7 can be selectively coupled to a public analog telephone line PL through the line control circuit 9. The user can make and receive a telephone call with the telephone part 8.

When transmitting a color still picture, the color still picture is sequentially entered from the input device 1 and is converted into a digital image signal in the digitizing circuit 2. The digital image signal is sequentially stored in the memory 3. The digital image signal is sequentially read out from the memory 3 under the control of the control device 10 and is converted into a color image signal in the image signal producing circuit 4, and the display device 5 sequentially displays a color still picture reproduced from the color image signal. When the user decides on the color still picture to be transmitted, the digital image signal read out from the memory 3 is also supplied to the compression and expansion circuit 6 wherein the digital image signal is compressed under the control of the control device 10. A compressed digital image signal is supplied to the transmitting and receiving circuit 7 and is transmitted on the public analog telephone line PL through the line control circuit 9.

On the other hand, when receiving a color still picture, the compressed digital image signal is received by the transmitting and receiving circuit 7 through the public analog telephone line PL and the line control circuit 9. The compression and expansion circuit 6 expands the compressed digital image signal back into the original digital image signal which is then stored in the memory 3 under the control of the control device 10. The digital image signal read out from the memory 3 is converted into the color image signal in the image signal producing circuit 4, and the display device 5 displays the color still picture reproduced from the color image signal.

Figure 2:
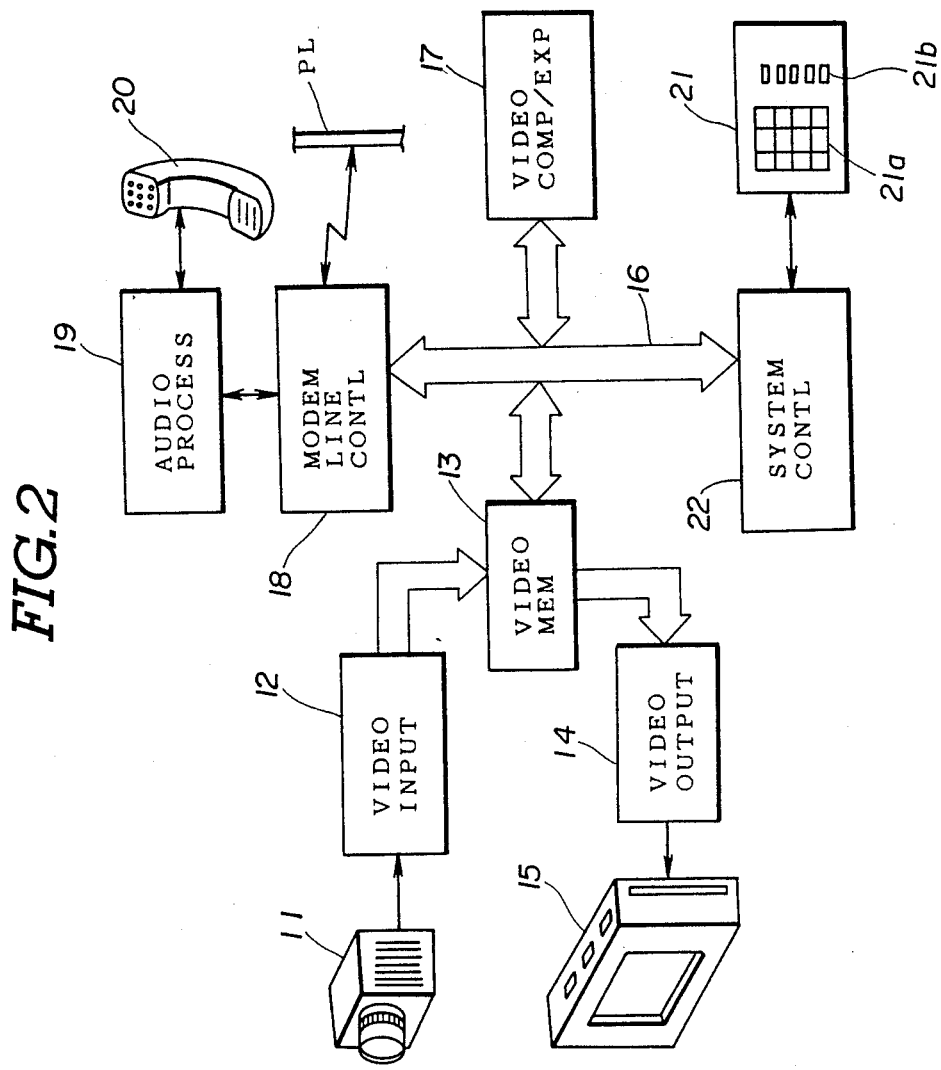
FIG. 2 is a system block diagram showing the first embodiment in more detail.

FIG. 2 shows a more detailed block system of the first embodiment. The video phone comprises a color charge coupled device (CCD) video camera 11, a video signal input circuit 12, a video memory 13, a video signal output circuit 14, a color liquid crystal display (LCD) panel 15, a system bus 16, a video compression and expansion circuit 17, a modem line control circuit 18, a voice processing circuit 19, a handset 20, a keyboard 21, and a system controller 22.

The video camera 11, the video signal input circuit 12, the video memory 13, the video signal output circuit 14 and the LCD panel 15 respectively correspond to the input device 1, the digitizing circuit 2, the memory 3, the image signal producing circuit 4 and the display device 5 shown in FIG. 1. The video compression and expansion circuit 17 and the modem line control circuit 18 respectively correspond to the compression and expansion circuit 6 and the line control circuit 9. The voice processing circuit 19, the handset 20 and the keyboard 21 correspond to the telephone part 8. In addition, the system controller 22 correspond to the control device 10.

The video camera 11 uses CCD as the image pickup device and is most suited for a portable video phone in that the video camera 11 is compact and light and has a low power consumption and a high sensitivity. The video signal input circuit 12 receives an output composite color video signal of the video camera 11. This composite color video signal is an NTSC system color video signal, for example. Accordingly, it is possible to supply to the video signal input circuit 12 an output composite color video signal of a general television apparatus or a video tape recorder, and transmit the image described by such a composite color video signal. The video signal input circuit 12 separates synchronizing signals and a video signal from the incoming composite color video signal, and produces analog RGB signals (primary color signals of red (R), green (G) and blue (B)) by subjecting the separated video signal to a chroma processing. The analog RGB signals are sampled and then subjected to an analog-to-digital conversion so as to obtain digital RGB signals. The digital RGB signals are written into the video memory 13 responsive to the synchronizing signals separated in the video signal input circuit 12.

In the present embodiment, the image to be transmitted is a portrait and the like, and the accuracy required of the image is not extremely high. For example, it is sufficient that the digital RGB signals describe the image in 96×96 picture elements and each of the RGB signals describe the gradation in four bits (that is, sixteen gradation levels).

The digital RGB signals stored in the video memory 13 are read out by the video signal output circuit 14 and are subjected to a digital-to-analog conversion so as to obtain analog RGB signals. The analog RGB signals are then processed into a video signal by an encoding process, and the video signal is formed into a composite color video signal by being added with synchronizing signals produced within the video signal output circuit 14. The output composite color video signal of the video signal output circuit 14 is an NTSC system color video signal, for example. Thus, the output composite color video signal of the video signal output circuit 14 may be supplied to the general video tape recorder, a video printer and the like for recording or displaying the color still picture. The video printer is sometimes also referred to as a hard copy device since it makes a hard copy of the color still picture.

In the present embodiment, the output composite color video signal of the video signal output circuit 14 is supplied to the LCD panel 15 for displaying the color still picture. The LCD panel 15 is built into the video phone. The LCD panel 15 is thin and light and has a low power consumption, making it most suited for use in the personal video phone. Taking into consideration the purpose of the present embodiment, it is sufficient that the digital RGB signals read out from the video memory 13 describe the image in a maximum of 256×256 picture elements and each of the RGB signals describe the gradation in four bits (that is, sixteen gradation levels).

Figure 3:
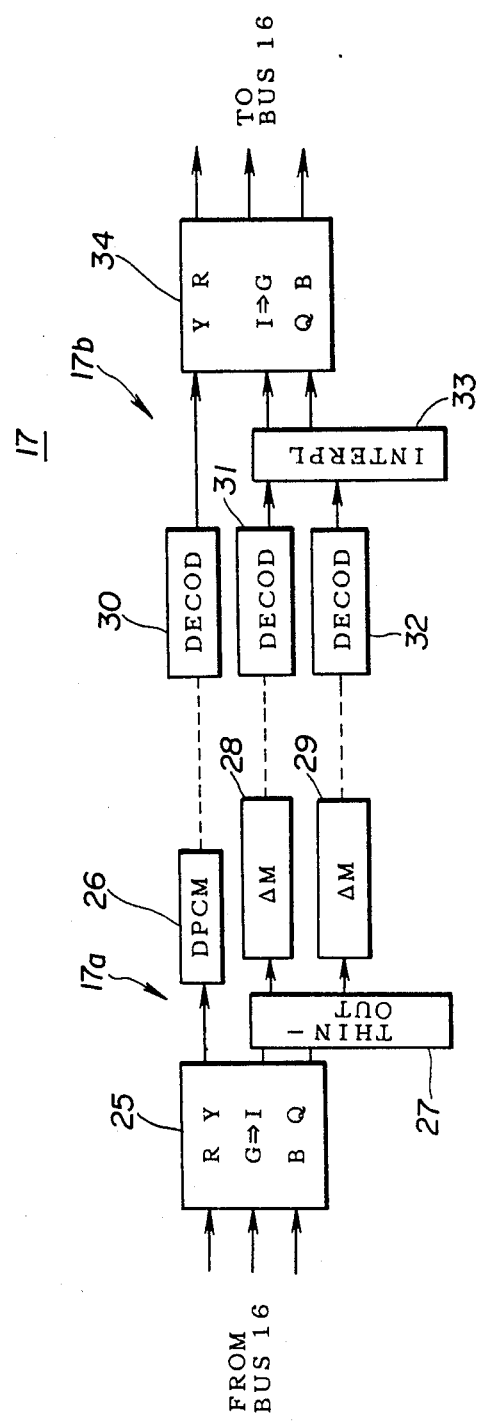
FIG. 3 is a system block diagram showing an embodiment of a compression and expansion circuit of the first embodiment.

Next, a description will be given on the image transmission procedure. The digital RGB signals stored in the video memory 13 are read out on the system bus 16 and are supplied to the video compression and expansion circuit 17. FIG. 3 shows an embodiment of the video compression and expansion circuit 17. The video compression and expansion circuit 17 comprises a compression part 17a and an expansion part 17b. The compression part 17a comprises a signal converting circuit 25, a differential pulse code modulator 26, a thin-out circuit 27, and advanced adaptive delta modulators 28 and 29. The expansion part 17b comprises decoders 30 through 32, an interpolator 33 and a signal converting circuit 34.

The signal converting circuit 25 converts the digital RGB signals received through the system bus 16 into color difference signals and a luminance signal having small redundancy. For example, the color difference signals are I and Q signals and the luminance signal is a Y signal used in the general color television system. The digital Y, I and Q signals are compressed and encoded in the compression part 17a.

Figure 4:
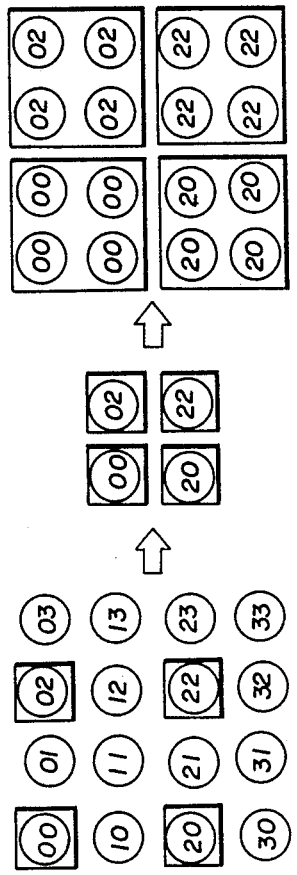
FIG. 4 is a diagram for explaining the operation of the compression and expansion circuit.

By taking into account the fact that the image to be transmitted is a still picture, the DPCM is used to compress and encode the Y signal. The differential pulse code modulator 26 subjects the Y signal to the DPCM within each frame. On the other hand, by taking into account the visual characteristic of the color difference signals, it is possible to reduce the information quantity of the I and Q signals. For example, as shown in FIG. 4, each of the I and Q signals related to a picture element are selected once in every four picture elements, where "00" through "33" denote picture elements. In other words, when transmitting the Y signal amounting to 96×96 picture elements, for example, the thin-out circuit 27 thins out the I and Q signals so that the I and Q signals amounting to only 48×48 picture elements are supplied to the respective advanced adaptive delta modulators 28 and 29. The advanced adaptive delta modulators 28 and 29 subject the I and Q signals to an advanced adaptive delta modulation which will be described later in the specification.

Although the I and Q signals are thinned out, virtually no effects are visible to the human eye when the transmitted image is reproduced, and it is possible to greatly reduce the information quantity of the original RGB signals. The compressed image data is supplied to the modem line control circuit 18 through the system bus 16. The modem line control circuit 18 converts the compressed image data into a voice frequency signal, and this voice frequency signal is transmitted through the public analog telephone line PL to be received at a destination video phone.

Figure 5:
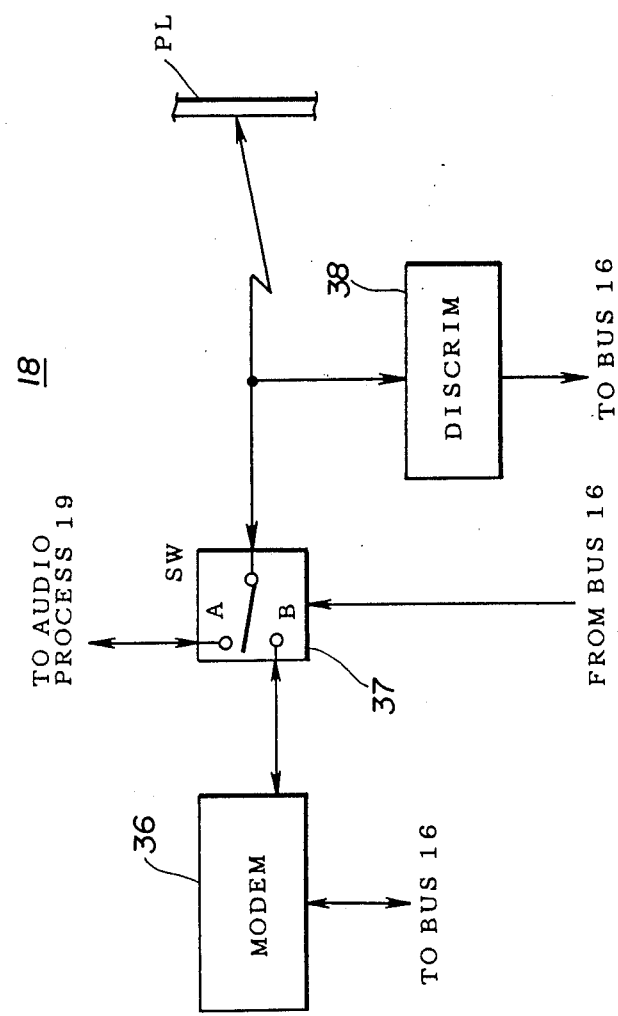
FIG. 5 is a system block diagram showing an embodiment of a modem line control circuit of the first embodiment.

FIG. 5 shows an embodiment of the modem line control circuit 18. The mode line control circuit 18 comprises a modem 36 for modulating the compressed image data which is to be transmitted into the voice frequency signal and for demodulating the voice frequency signal which is received into the compressed image data, a switching circuit 37 and a discriminating circuit 38. The switching circuit 37 is connected to a terminal A when transmitting or receiving a voice (audio) signal, that is, when making an ordinary telephone call. On the other hand, the switching circuit 37 is connected to a terminal B when transmitting or receiving the voice frequency signal, that is, when transmitting or receiving the image. The discriminating circuit 38 is not used for normal image transmission and reception and may be omitted. The operation of the discriminating circuit 38 will be described later in the specification. The caller confirms over the ordinary telephone function whether or not the receiver on the receiving end is ready to receive an image. For example, the caller asks whether or not he can start the image transmission, and the receiver agrees when ready. When the receiver is ready, the receiver manipulates a receive key among function keys of a keyboard and the caller manipulates a send key among function keys 21b of the keyboard 21 to start the image transmission. The system controller 22 generates a switching control signal for controlling the connecting state of the switching circuit 37 responsive to the manipulation of the send key or the receive key, and this switching control signal is supplied to the switching circuit 37 through the system bus 16.

On the other hand, the voice frequency signal from the caller is received by the modem line control circuit 18 through the public analog telephone line PL. The received voice frequency signal is subjected to a procedure complementary to the transmitting procedure. In other words, the received voice frequency signal is demodulated into the compressed image data in the modem 36. The compressed image data is expanded and decoded into the digital RGB signals in the video compression and expansion circuit 17. It is not essential that the compressed image data is expanded back into the original digital RGB signals as long as a satisfactory picture quality is obtainable.

In other words, the compressed image data obtained from the modem 36 of the modem line control circuit 18 is supplied to the decoders 30 through 32 shown in FIG. 3 through the system bus 16. The decoder 30 decodes the DPCM Y signal within the compressed image data to output a decoded Y signal. Similarly, the decoders 31 and 32 respectively decode the advanced adaptive delta modulated and thinned out I and Q signals within the compressed image data to output decoded I and Q signals. The decoded thinned out I and Q signals are expanded as shown in FIG. 4. The Y signal from the decoder 30 and the I and Q signals of the decoders 31 and 32 are supplied to the signal converting circuit 34 which converts these signals back to the digital RGB signals, and the digital RGB signals are written into the video memory 13 through the system bus 16. The video signal output circuit 14 reads the stored RGB signals and displays the color still picture on the LCD panel 15.

Therefore, when transmitting the image, the data on the image to be transmitted is read out from the video memory 13 and is simultaneously supplied to the video signal output circuit 14 and the video compression and expansion circuit 17. In other words, a dual port memory is used for the video memory 13. Hence, it is possible to monitor the image which is transmitted on the LCD panel 15. This feature is useful in that the user can check the actual image which is transmitted. On the other hand, when receiving the image, the data on the received image is read out from the video memory 13 and is displayed on the LCD panel 15.

Figure 6:
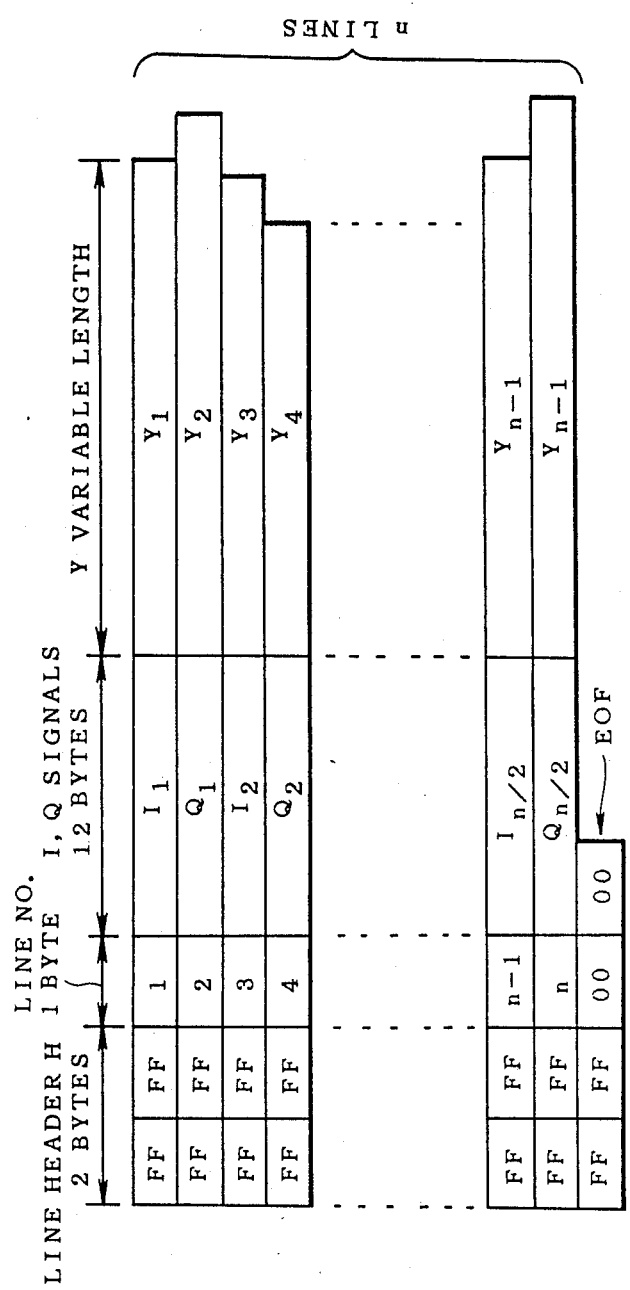
FIG. 6 shows an embodiment of a transmission data format used in the first embodiment.

There is a need to set the transmission data format of the compressed image data supplied to the modem 36 of the modem line control circuit 18. An embodiment of the transmission data format is shown in FIG. 6. In FIG. 6, it is assumed that one picture comprises n lines. A header part H amounting to two bytes is provided at the beginning of each line data followed by one byte of line number data, twelve bytes of the color difference signal I or Q and the luminance signal Y of variable length. The value of the header part is set to "FFFF" in hexadecimal so as not to confuse with the data portion of the line data. An end of file part EOF amounting to two bytes is provided at the end of the n-th line data after the header part H, to indicate the end of the image data. The value of the end of file part EOF is set to "0000" in hexadecimal so as not to confuse with the data portion of the line data.

According to the present embodiment, the public analog telephone line PL is used for the transmission path of the image data. For this reason, the destination video phone need not have a construction identical to that of the sending video phone (caller). For example, the image data can be received by other types of image transmission and/or reception devices, such as a facsimile machine. When making the image transmission and reception between two image transmission and/or reception devices of different types, it is necessary to communicate prior to the image transmission and reception, recognition data for recognizing each others types of devices, data format and the like. However, such a communication of the recognition data can be made with ease by using the existing standardized communication procedure for the facsimile machine.

When a 9600 bps digital modem of the V.29 standard set by the Comité Consultatif International Télégraphique et Téléphonique (CCITT) recommendations is used for the modem 36 of the modem line control circuit 18, it is possible to transmit an image made up of $96 \times 96$ picture elements and described by RGB signals each comprising four bits in approximately 2.9 seconds ($=96 \times 96 \times 3$ $bit$/9600 $bps$), because the image data can essentially be compressed to three bits per picture element by using the information compression procedure described before. The information compression procedure includes the conversion into the Y, I and Q signals, the DPCM within each frame, and the thinning out of the I and Q signals. The present embodiment is thus applicable to the personal video phone because a color still picture of a satisfactory picture quality can be transmitted within a short time.

Next, a description will be given on the operating procedures of the present embodiment. The video phone also has the functions of the ordinary telephone. Thus, when making an ordinary telephone call, the modem line control circuit 18 couples the public analog telephone line PL to the voice processing circuit 19, and a conversation made through the handset 20 is processed into a voice (audio) signal in the voice processing circuit 19. The voice signal from the voice processing circuit 19 is transmitted to the destination telephone or video phone through the modem line control circuit 18 and the public analog telephone line PL. The voice signal on the public analog telephone line PL can be received by the handset 20 in a sequence in reverse to the above described.

The telephone number of the destination telephone or video phone can be registered from a ten-key 21a of the keyboard 21. By making the modem line control circuit 18 have the dual tone multiple frequency (DTMF) or pulse dialing function, it is possible to call a registered telephone number when a code number is entered from the ten-key 21a. In this case, the system controller 22 sends to the modem line control circuit 18 the registered telephone number corresponding to the code number entered from the ten-key 21a.

The system controller 22 may be designed to store numbers and characters entered from the keyboard 21. In this case, it is possible to make a personal telephone directory by manipulating the function keys 21b and the ten-key 21a of the keyboard 21, and also make simplified dialing and automatic calling. In order to make such calls, it is necessary to provide a function of displaying the number and characters for easy and correct manipulation of the keyboard 21. But in the present embodiment, it is unnecessary to provide a display exclusively for such calls because the LCD panel 15 is built into the video phone.

Accordingly, when making use of the special functions of the video phone such as the automatic calling, the system controller 22 writes a character pattern into the video memory 13 through the system bus 16, and the character pattern can be read out and displayed on the LCD panel 15. Arbitrary digital RGB signals can be written into the video memory 13 thus making it possible to simultaneously display the image to the transmitted and the character pattern.

Figure 7:
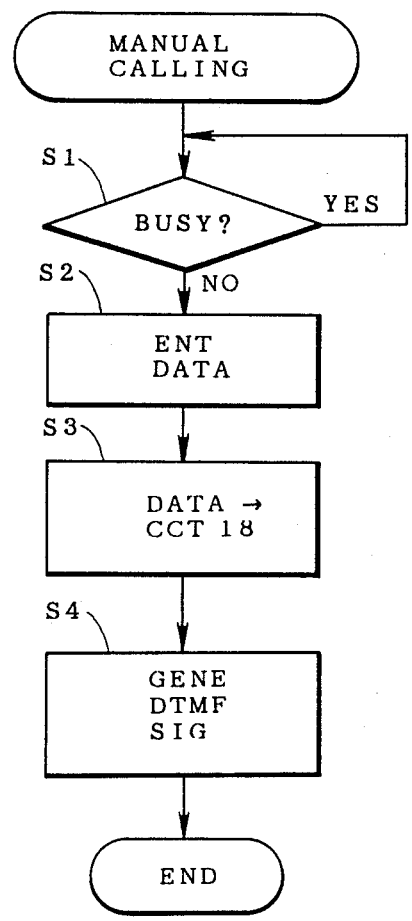
FIG. 7 is a flow chart for explaining the operation of a system controller of the first embodiment when making a manual calling.

FIG. 7 shows a flow chart for explaining the operation of the system controller 22 when making a manual calling. A step S1 discriminates whether or not the video phone is already in use and the line is busy. When the discrimination result in the step S1 is NO, a step S2 reads the data entered from the keyboard 21. A step S3 sends the read data to the modem line control circuit 18, and a step S4 generates a DTMF signal through the modem line control circuit 18.

Figure 8:
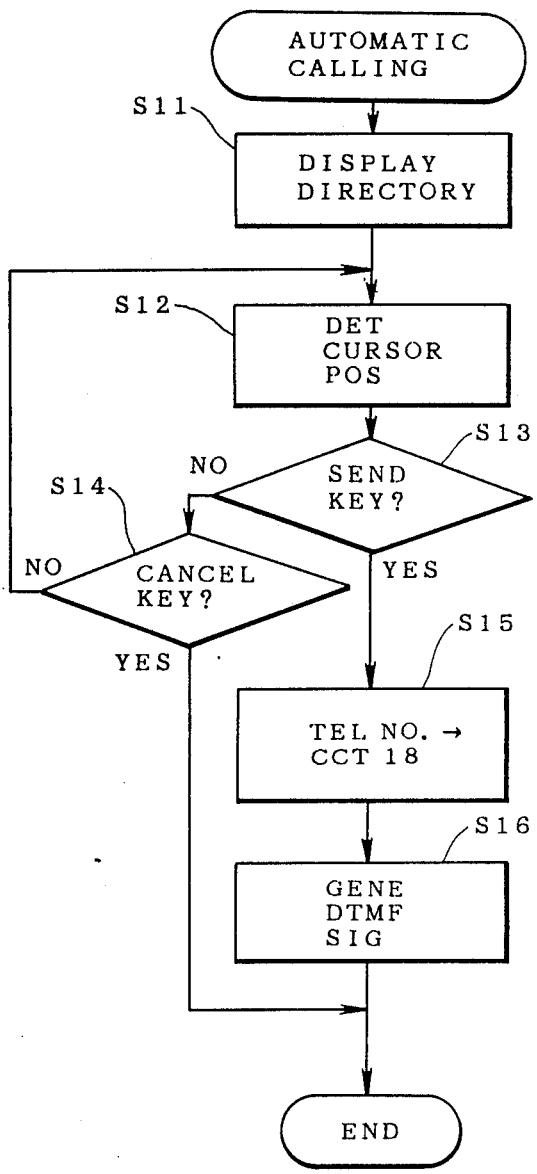
FIG. 8 is a flow chart for explaining the operation of the system controller of the first embodiment when making an automatic calling.
Figure 9:
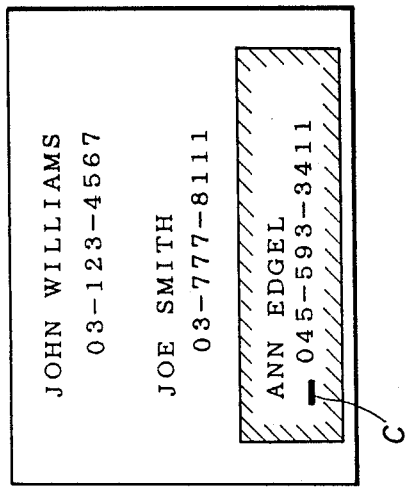
FIG. 9 shows an example of a display on an LCD panel for explaining the automatic calling in the first embodiment.

FIG. 8 shows a flow chart for explaining the operation of the system controller 22 when making an automatic calling. A step S11 displays the personal telephone directory on the LCD panel 15. The user moves a cursor C on the display shown in FIG. 9 of the LCD panel 15, and a step S12 detects the position of the cursor C. A step S13 discriminates whether or not the send key of the keyboard 21 is manipulated. When the discrimination result in the step S13 is NO, a step S14 discriminates whether or not a cancel key of the keyboard 21 is manipulated. The process returns to the step S12 when the discrimination result in the step S14 is NO. On the other hand, the operation is ended to start the next process when the discrimination result in the step S14 is YES. When the discrimination result in the step S13 is YES, a step S15 selects the registered telephone number depending on the position of the cursor C and supplies the registered telephone number to the modem line control circuit 18. A step S16 generates the DTMF signal through the modem line control circuit 18, and the operation is ended thereafter.

Figure 10:
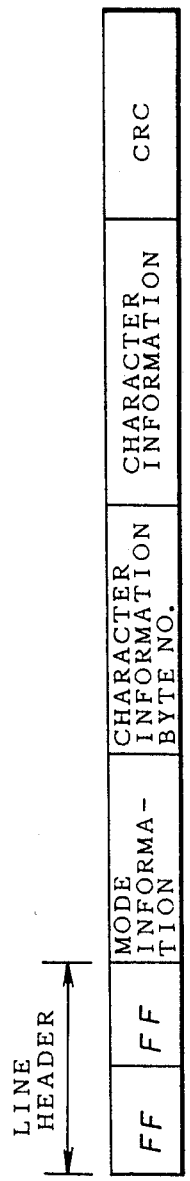
FIG. 10 shows an embodiment of a transmission data format for the case where the mode information and the character information are transmitted.

It is possible to include in the image data transmitted to the modem line control circuit 18 characters entered from the keyboard 21, characters generated by the system controller 22 and the like, and transmit such image data on the public analog telephone line PL. In other words, the transmission of the image data including the character information may be applied to various use such as transmitting the personal telephone directory, making a cipher transmission or a confidential transmission and the like. When transmitting characters, it is simply necessary to transmit prior to the transmission data format shown in FIG. 6 mode information and character information such as those shown in FIG. 10. In FIG. 10, CRC denotes a cyclic redundancy code.

A generally available microcomputer may be used for the system controller 22 to carry out the processes described heretofore. The flexibility of the microcomputer allows for a data format conversion to be carried out for maintaining compatibility with the image transmission and/or reception device on the other end of the public analog telephone line PL. In addition, the low cost of the microcomputer is suited for use in the personal video phone.

Figure 11:
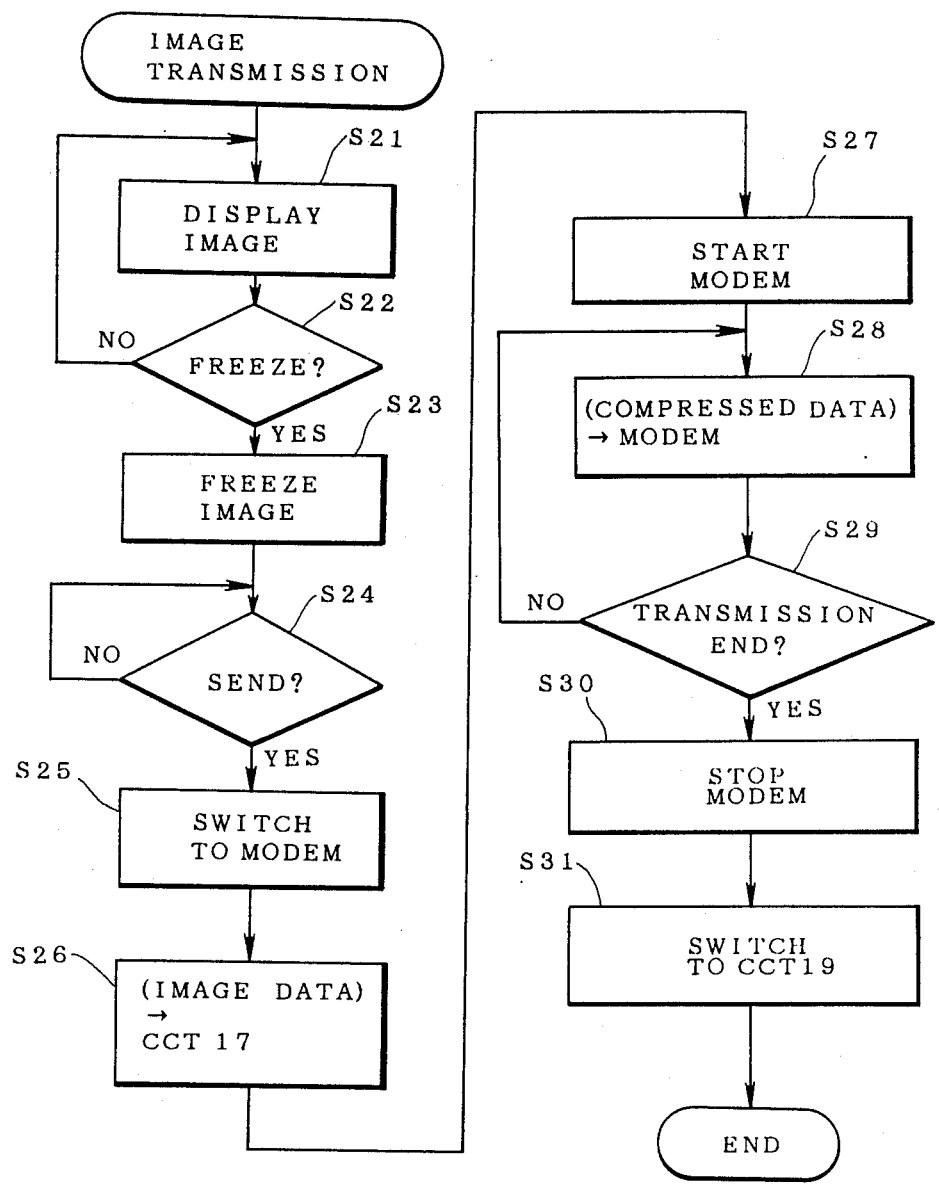
FIG. 11 is a flow chart for explaining the image transmission procedure of the first embodiment.

Next, a description will be given on the image transmission procedure of the video phone by referring to FIG. 11 which shows the basic operation of the system controller 22.

Normally, the image picked up by the video camera 11 is constantly and successively written into the video memory 13 as image data, and the picked up image is displayed by use of a portion or all of the LCD panel 15 by constantly and successively reading out the stored image data. Hence, a step S21 displays the picked up image on the LCD panel 15. When the user decides on what image is to be transmitted, the user manipulates a freeze key among the function keys 21b of the keyboard 21 and determines the still picture which is to be transmitted. A step S22 discriminates whether or not the freeze key is manipulated, and a step S23 freezes the image when the discrimination result in the step S22 becomes YES. The image is frozen by stopping the sequential write-in of the RGB signals into the video memory 13 so that the still picture is displayed on the LCD panel 15. Then, the user confirms over the ordinary telephone function whether or not the receiver at the receiving end is ready to receive the image. The user manipulates the send key among the function keys 21b of the keyboard 21 to start the image transmission when the receiver is ready. A step S24 discriminates whether or not the send key is manipulated.

When the discrimination result in the step S24 is YES, a step S25 controls the switching circuit 37 within the modem line control circuit 18 to switch over and couple the public analog telephone line PL from the voice processing circuit 19 to the modem 36 of the modem line control circuit 18. A step S26 supplies the digital RGB signals related to the still picture (frozen image) from the video memory 13 to the video compression and expansion circuit 17 wherein the digital RGB signals are compressed and encoded. A step S27 starts the modem 36 of the modem line control circuit 18, and a step S28 supplies the compressed image data from the video compression and expansion circuit 17 to the modem 36. Hence, the compressed image data is converted into the voice frequency signal and transmitted on the public analog telephone line PL.

A step S29 discriminates whether or not the image transmission is ended. For example, the end of the image transmission can be detected from the EOF code. The process returns to the step S28 to retransmit the image data when the discrimination result in the step S29 is NO. On the other hand, when the discrimination result in the step S29 becomes YES, a step S30 stops the modem 36 of the modem line control circuit 18. In addition, a step S31 controls the switching circuit 37 within the modem line control circuit 18 to switch over and couple the public analog telephone line PL from the modem 36 of the modem line control circuit 18 to the voice processing circuit 19. In this state, the video phone is ready to make the normal telephone conversation between the receiver by using the ordinary telephone function thereof, and the operation is ended.

Figure 12A:
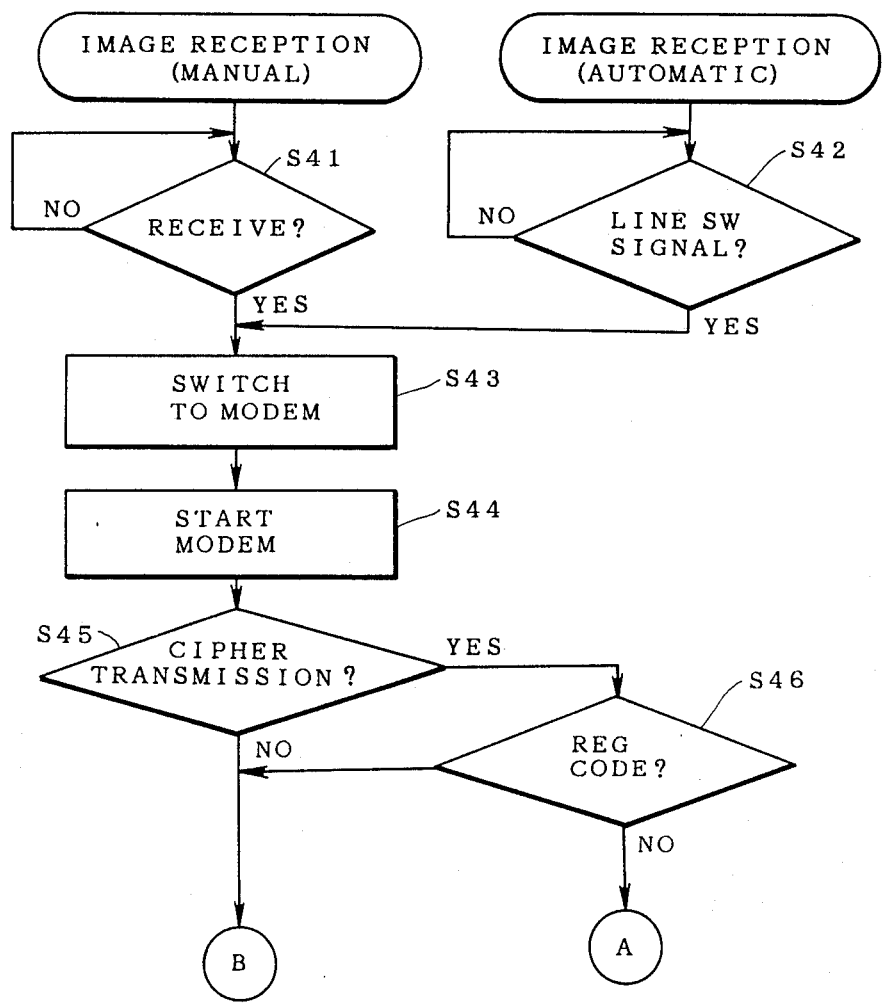
FIGS. 12A and 12B are flow charts for explaining the image reception procedure of the first embodiment.
Figure 12B:
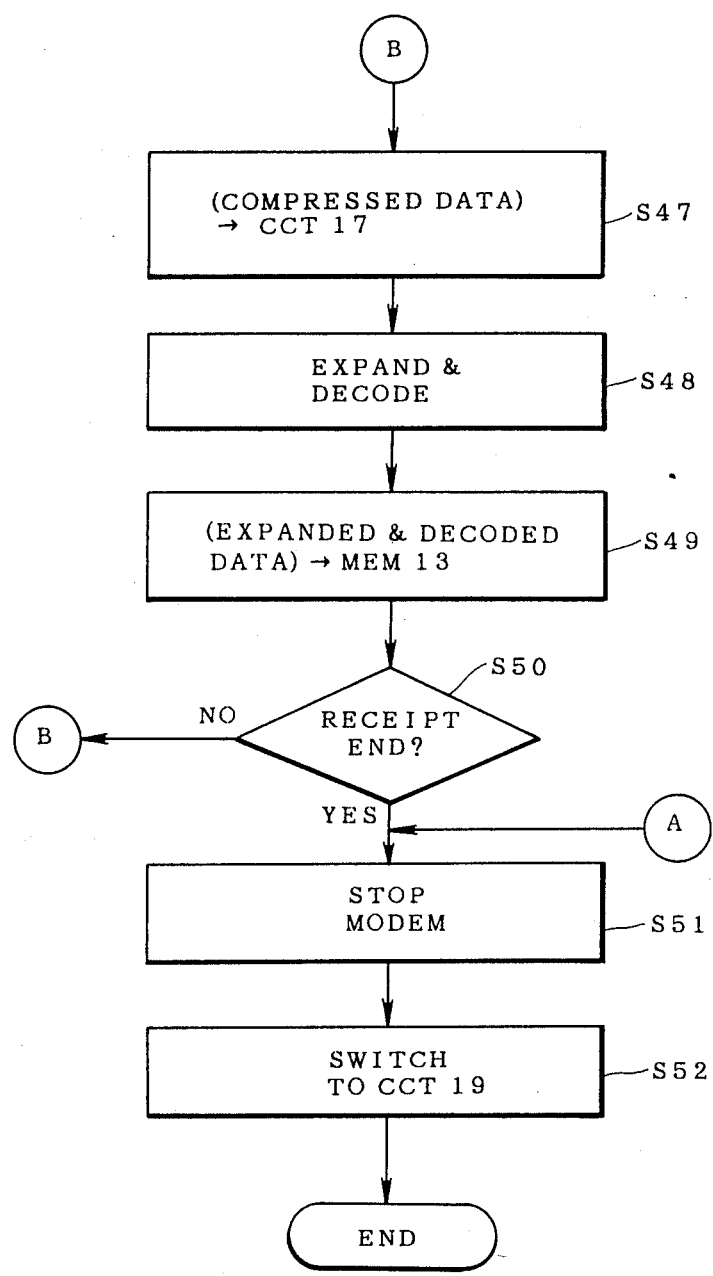

Next, a description will be given on the image receiving procedure of the video phone by referring to FIGS. 12A and 12B which show the basic operation of the system controller 22. When receiving the image from the caller manually, the receiver confirms over the ordinary telephone function between the caller that the receiver is ready to receive the transmitted image, and the receiver manipulates the receive key of the keyboard 21. On the other hand, when receiving the image from the caller automatically, the discriminating circuit 38 within the modem line control circuit 18 shown in FIG. 5 discriminates whether or not a line switching signal is received from the caller. The line switching signal is received when the caller wishes to transmit the image to the receiver. In this case, no receive key is required on the receiving end, but it is necessary to provide means for generating the line switching signal. The discriminating circuit 38 outputs a detection signal indicative of whether or not the the line switching signal is received, and the system controller 22 generates the switching control signal for controlling the connecting state of the switching circuit 37 responsive to the detection signal. This switching control signal is supplied to the switching circuit 37 through the system bus 16 to connect the switching circuit 37 to the terminal B when the line switching signal is received.

Accordingly, in the case of the manual image reception, a step S41 discriminates whether or not the receive key of the keyboard 21 is manipulated. In the case of the automatic image reception, a step S42 discriminates whether or not the line switching signal is received by use of the output detection signal of the discriminating circuit 38 within the modem line control circuit 18. It is possible to carry out the function of the discriminating circuit 38 within the system controller 22, and in this case, the discriminating circuit 38 may be omitted. When the discrimination result in the step S41 or S42 is YES, the process advances to a step S43.

A step S43 controls the modem line control circuit 18 to couple the public analog telephone line PL to the modem 36 within the modem line control circuit 18. A step S44 starts the modem 36, and a step S45 discriminates whether or not the image transmission involves cipher transmission. When the discrimination result in the step S45 is YES, a step S46 discriminates whether or not the received cipher transmission can be decoded by use of registered codes, that is, whether or not the codes used in the received cipher transmission coincide with registered codes. The process advances to a step S51 when the discrimination result in the step S46 is NO. The process advances to a step S47 when the discrimination result in the step S45 is NO or the discrimination result in the step S46 is YES.

The received voice frequency signal (image data) is demodulated into the compressed image data in the modem 36, and the step S47 supplies the compressed image data to the video compression and expansion circuit 17. A step S48 expands the compressed image data into the digital RGB signals in the video compression and expansion circuit 17. A step S49 writes the digital RGB signals into the video memory 13. Accordingly, the stored digital RGB signals are read out from the video memory 13 and the received image data is displayed as a still picture on the LCD panel 15 through the video signal output circuit 14.

A step S50 discriminates whether or not the receipt of the image data is ended. The process returns to the step S47 when the discrimination result in the step S50 is NO, but advances to the step S51 when the discrimination result in the step S50 is YES. The step S51 stops the modem 36, and a step S52 controls the switching circuit 37 within the modem line control circuit 18 to switch over and couple the public analog telephone line PL from the modem 36 of the modem line control circuit 18 to the voice processing circuit 19. In this state, the video phone is ready to make the normal telephone conversation between the caller by using the ordinary telephone function thereof, and the operation is ended.

As a modification of the cipher transmission, it is possible to transmit the exchange number and the registered number (telephone number) of the caller in place of the codes. In this case, the receiving end has the telephone numbers of known callers registered, so that the telephone number received in the cipher transmission can be searched from the registered telephone numbers on the receiving end. A step corresponding to the step S46 in this case discriminates whether or not the telephone number received in the cipher transmission coincides with one of the registered telephone numbers. It is possible to take measures to register its own telephone number so that the telephone number of the caller is automatically transmitted with the image data in the cipher transmission without the need to enter the telephone number with every call.

The system controller 22 can write the digital RGB signals at arbitrary locations of the video memory 13. Hence, it is possible to display the received image using an arbitrary portion or all of the LCD panel 15. In addition, it is possible to simultaneously display on the LCD panel 15 the image picked up by the video camera 11 and the received image.

In the case of manual image reception, it is possible to refuse the reception of the transmitted image by not manipulating the receive key of the keyboard 21. In this case, the discrimination result in the step S41 remains to be NO, and no display of the received image is made. On the other hand, in the case of the automatic image reception, it is possible to provide means for enabling and disabling the display of the received image on the LCD panel 15, so that the receiver can select not to see the received image. The means may be a refuse key of the keyboard 21 which is manipulated only when the user refuses to see the received image. The means may be a sliding cover which can cover the LCD panel 15 when the user does not wish to see the received image. In the case where the refuse key is provided, the discrimination result in the step S42 remains to be NO when the refuse key is manipulated even when the line switching signal is received, and no display of the received image is made.

Figure 13:
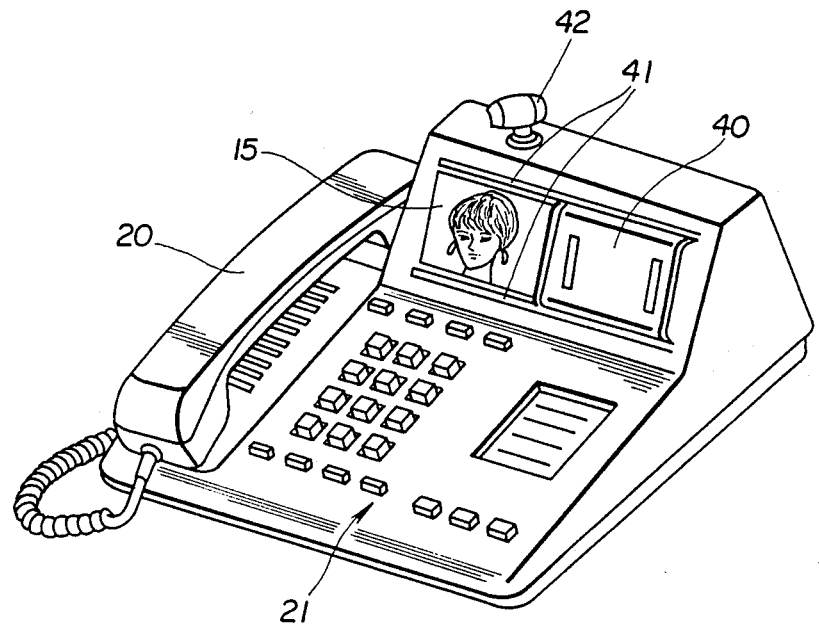
FIGS. 13A and 13B are perspective views respectively showing an embodiment of the external appearance of the video phone.
Figure 13:
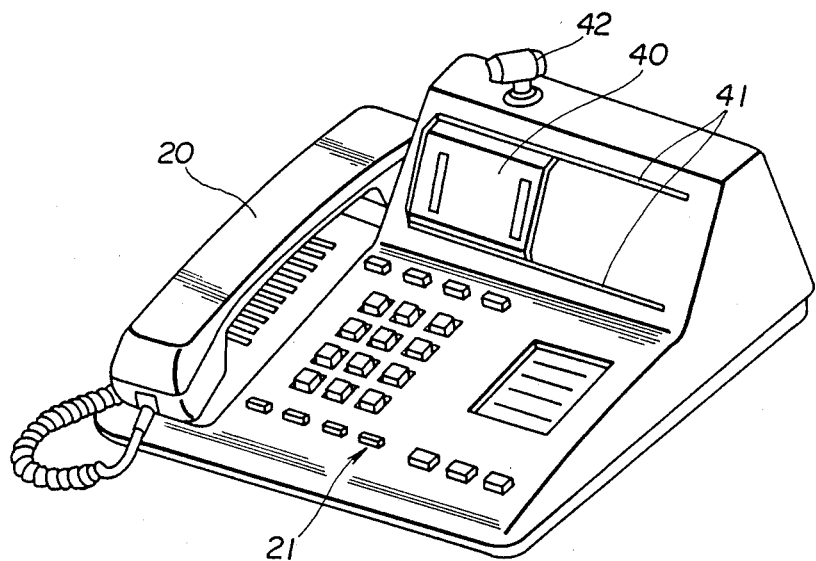

FIGS. 13A and 13B show an embodiment of the external appearance of the video phone. In FIGS. 13A and 13B, those parts which are the same as those corresponding parts in FIG. 2 are designated by the same reference numerals, and a description thereof will be omitted. The video phone comprises a sliding cover 40 which is slidable along rails 41, and an image sensor part 42 of the video camera 11. The image which is transmitted or received is visible when the sliding cover 40 is in an open position shown in FIG. 13A, but the transmitted or received image is not visible when the sliding cover 40 is in a closed position shown in FIG. 13B.

Figure 14:
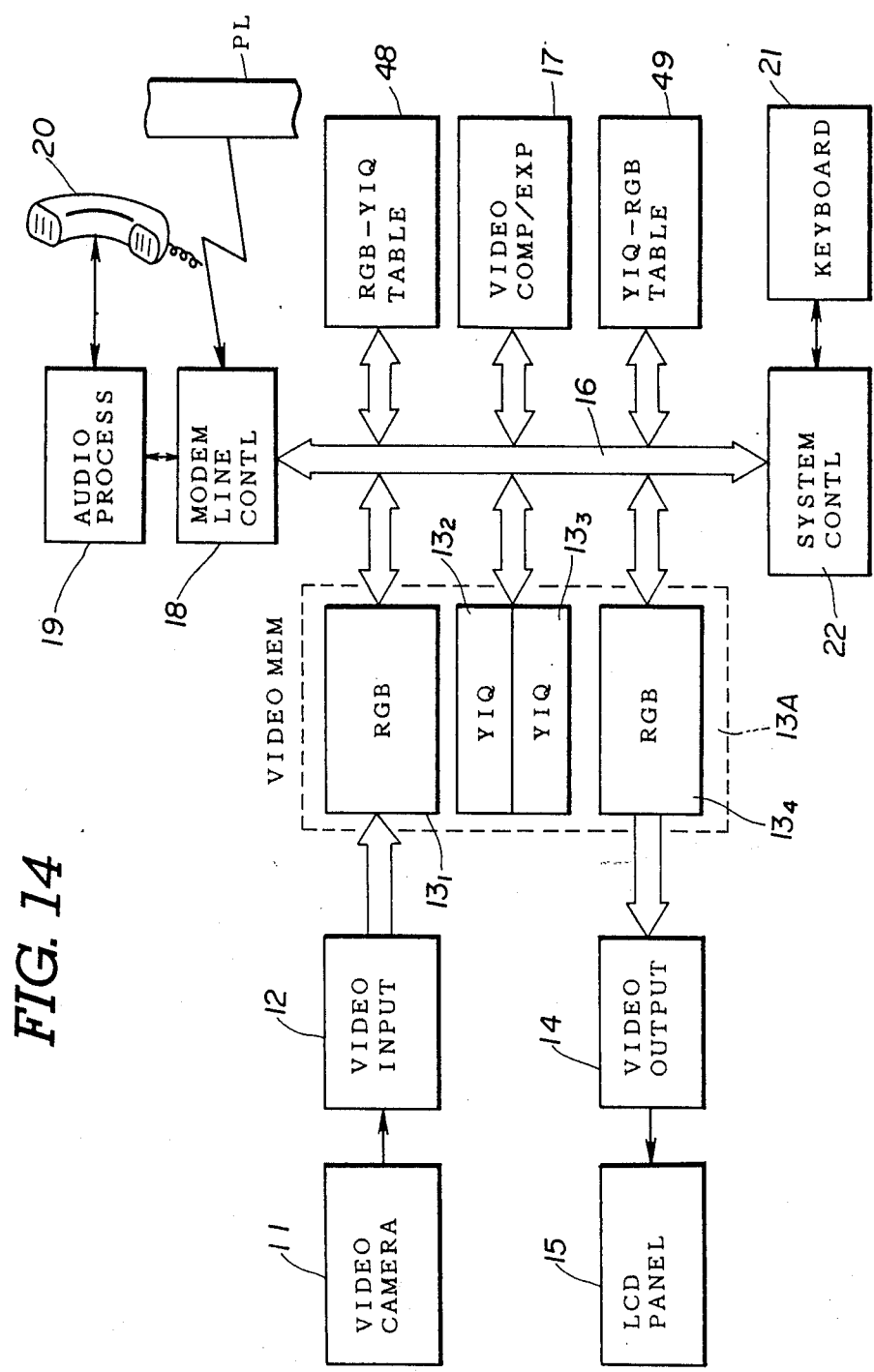
FIG. 14 is a system block diagram showing a second embodiment of the image transmission system applied to the video phone.

Next, a description will be given on a second embodiment of the image transmission system according to the present invention applied to the video phone. FIG. 14 generally shows the second embodiment, and in FIG. 14, those parts which are essentially the same as those corresponding parts in FIG. 2 are designated by the same reference numerals.

In the present embodiment, a video memory 13A comprises a first RGB part $13_1$ for storing input RGB signals, first and second YIQ parts $13_2$ and $13_2$ for respectively storing input and output YIQ signals, and a second RGB part $13_4$ for storing output RGB signals.

For example, the video memory 13A has a memory capacity for storing RGB signals amounting to 256×256 picture elements with each primary color signal describing one picture element by six bits. An RGB-to-YIQ signal conversion table (hereinafter simply referred to as RGB-YIQ table) 48 and a YIQ-to-RGB conversion table (hereinafter simply referred to as YIQ-RGB table) 49 are additionally coupled to the system bus 16. The RGB-YIQ table 48 is used to convert RGB signals into the Y, I and Q signals (hereinafter also referred to as YIQ signals). On the other hand, the YIQ-RGB table 49 is used to convert the YIQ signals into the RGB signals.

The image picked up by the video camera 11 is converted into the RGB signals in the video signal input circuit 12, and the RGB signals are once stored in the first RGB part $13_1$ of the video memory 13A. The RGB-YIQ table 48 reads out the RGB signals stored in the first RGB part $13_1$ and converts the RGB signals into the YIQ signals under the control of the system controller 22, and the YIQ signals are stored in the first YIQ part $13_2$ of the video memory 13A.

When carrying out a simulation to display the image which is to be transmitted exactly as it would be received and monitored on the receiving end, the YIQ signals stored in the first YIQ part $13_2$ of the video memory 13A are read out and supplied to the video compression and expansion circuit 17 wherein the YIQ signals are compressed and encoded. The compressed image data obtained in the video compression and expansion circuit 17 is then expanded and decoded therein to reproduce the YIQ signals. The reproduced YIQ signals from the video compression and expansion circuit 17 are stored in the second YIQ part $13_3$ of the video memory 13A. The YIQ-RGB table 49 then reads out the reproduced YIQ signals stored in the second YIQ part $13_3$ and converts the reproduced YIQ signals into RGB signals. The output RGB signals of the YIQ-RGB table 49 are stored in the second RGB part $13_4$ of the video memory 13A. The RGB signals stored in the second RGB part $13_4$ are read out to the video signal output part 14 and displayed on the LCD panel 15. The still picture displayed on the LCD panel 15 is the image exactly as it would be seen on the receiving end. Therefore, the user (caller) can actually check and see how the receiver will see the image which is transmitted.

The construction of the video compression and expansion circuit 17 is basically the same as that of the video compression and expansion circuit 17 shown in FIG. 3, except that the video compression and expansion circuit 17 does not have the signal converting circuits 25 and 34, because the RGB-YIQ table 48 and the YIQ-RGB table 49 perform the functions of the signal converting circuits 25 and 34, respectively.

On the other hand, when actually starting the image transmission, the YIQ signals stored in the first YIQ part $13_2$ are read out and supplied to the video compression and expansion circuit 17 wherein the YIQ signals are compressed and encoded into the compressed image data. The compressed image data is converted into the voice frequency signal in the modem line control circuit 18 and transmitted to the public analog telephone line PL.

When receiving the image data transmitted from the caller, the voice frequency signal on the public analog telephone line PL is received and demodulated into the compressed image data in the modem line control circuit 18. The compressed image data is expanded and decoded into the YIQ signals in the video compression and expansion circuit 17, and the YIQ signals are stored in the second YIQ part $13_3$ of the video memory 13A. The YIQ signals stored in the second YIQ part $13_3$ are read out and converted into the RGB signals in the YIQ-RGB table 49, and the RGB signals are stored in the second RGB part $13_4$. The video signal output circuit 14 reads out the stored RGB signals from the second RGB part $13_4$, and the received image is displayed on the LCD panel 15.

Figure 15:
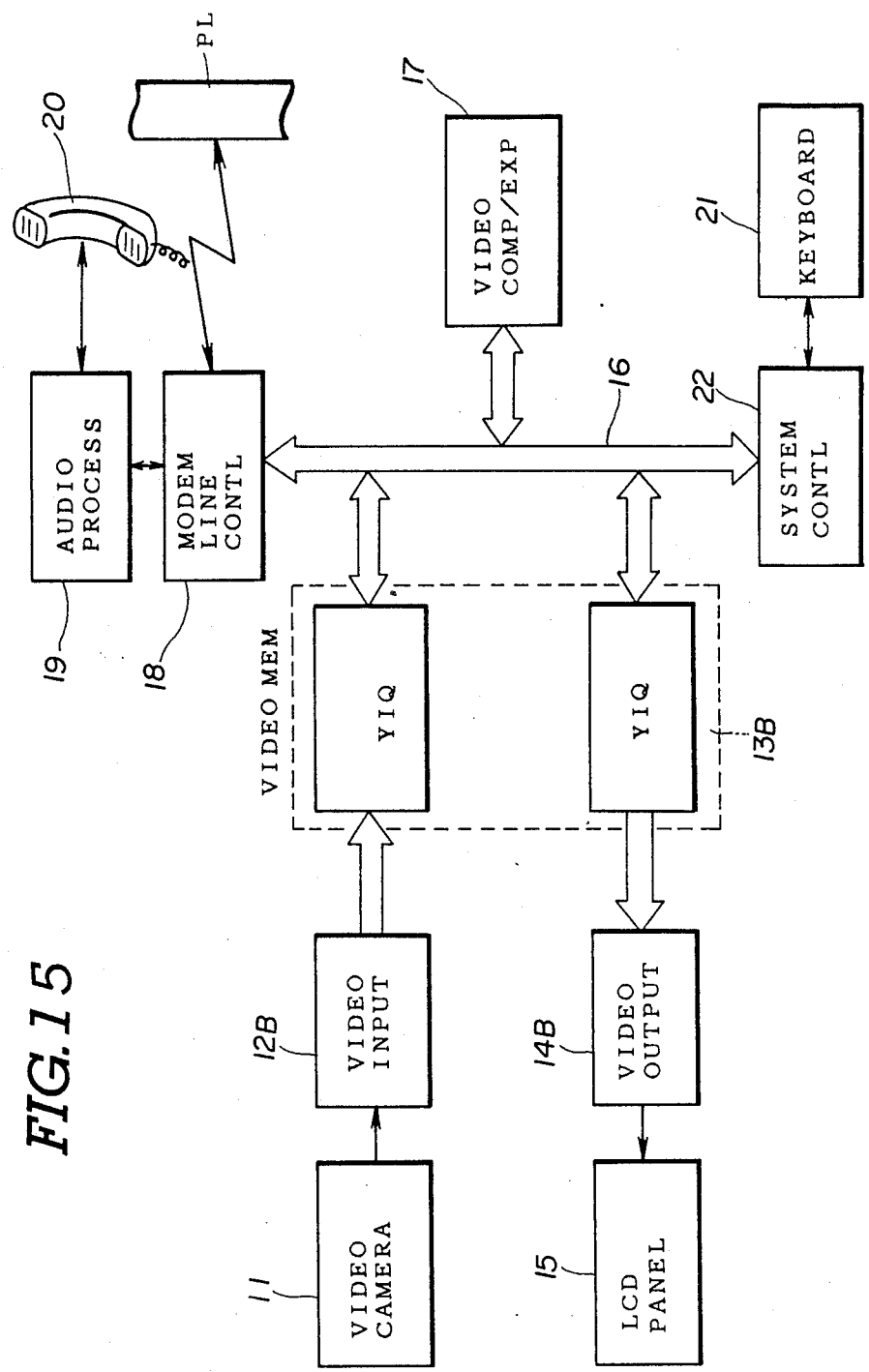
FIG. 15 is a system block diagram showing a third embodiment of the image transmission system applied to the video phone.

Next, a description will be given on a third embodiment of the image transmission system according to the present invention applied to the video phone. FIG. 15 generally shows the third embodiment, and in FIG. 15, those parts which are essentially the same as those corresponding parts in FIG. 2 are designated by the same reference numerals.

In the present embodiment, a video signal input circuit 12B includes a converting part for converting the output composite color video signal of the video camera 11 into YIQ signals. The output YIQ signals of the video signal input circuit 12B are stored in a video memory 13B. The signal converting circuits 25 and 34 of the first embodiment and the RGB-YIQ table 48 and the YIQ-RGB table 49 of the second embodiment are unnecessary in the present embodiment, because the image data is stored in the form of the YIQ signals. The stored YIQ signals in the video memory 13B are read out to a video signal output circuit 14B which includes a converting part for converting the YIQ signals into a signal format suited for display on the LCD panel 15. When providing the simulation function, the video memory 13B is designed to store the output YIQ signals of the video signal input circuit 12B in a first memory portion of the video memory 13B and to store the output reproduced YIQ signals of the video compression and expansion circuit 17 in a second memory portion of the video memory 13B, similarly as in the case of the second embodiment. The present embodiment is essentially equivalent to the case where the means for converting the RGB signals into the YIQ signals is included in the video signal input circuit 12B, and the means for converting the YIQ signals into the RGB signals is included in the video signal output circuit 14B.

As a modification of the third embodiment, it is possible to provide the means for converting the RGB signals into the YIQ signals within the video camera 11. Similarly, the means for converting the RGB signals into the YIQ signals may be provided within the LCD panel 15.

The first through third embodiments described heretofore process the image data in the form of the RGB signals and YIQ signals. However, the image data may be processed in other signal forms, and for example, the color difference signals may be R-Y and B-Y signals.

Next, a description will be given on the advanced adaptive delta modulation (hereinafter simply referred to as AADM) employed in the first through third embodiments described heretofore. The AADM is a unique new modulation technique especially suited for use in image transmission.

The adaptive delta modulation is a known modulation technique in which the quantization step size (width) of the difference signal in the delta modulation is varied with a constant rate depending on the values of the past encoded bits. The adaptive delta modulation uses the fact that the difference between mutually adjacent samples becomes small as the sampling frequency becomes high, and encodes the difference signal into one bit by carrying out the sampling at a high frequency. When encoding the difference signal into one bit, the quantization step size is determined from past transmission pulse train. In other words, when pulses of the same polarity repeat, the quantization step size is increased so as to follow a large difference between the mutually adjacent samples. On the other hand, the quantization step size is decreased to suppress the quantization noise when pulses of different polarities occur. Hence, according to the adaptive delta modulation, the quantization step size varies with a predetermined rate with respect to a change in the data.

However, because 50% or more picture element data out of the picture element data constituting a still picture usually have no change in the tone. For this reason, the tone of a reproduced picture becomes unstable when the delta modulation or the adaptive delta modulation is used. To the human eye, it is a large tone change in the still picture that has a large effect visually.

Accordingly, for image transmission, it is desirable that the adaptive delta modulation also have a zero quantization step size. In the present specification, the adaptive delta modulation which is modified to include the zero quantization step size is referred to as the AADM. The AADM is capable of reducing the noise in a flat portion of the signal waveform which is transmitted.

The AADM will now be described in conjunction with the video compression and expansion circuit 17 shown in FIG. 3. In the compression part 17a, the signal converting circuit 25 converts the RGB signals each having four bits into a 5-bit Y signal and 4-bit I and Q signals. The Y signal determines the resolution and gradation of the color still picture reproduced from the transmitted image data, and a compression system having a relatively high visual sensitivity and a satisfactory reproducibility must be used for the Y signal. For this reason, the Y signal is subjected to the DPCM in the differential pulse code modulator 26 using predictive coding. The differential pulse code modulator 26 employs the variable length code (Huffman code) shown in the following Table 1 for the encoding.

TABLE 1

| Code | Difference Value |
| --- | --- |
| 0 | 0 |
| 10 | +1 |
| 110 | −1 |
| 1110 | +2 |
| 11110 | −2 |
| 111110 | +3 |
| 1111110 | −3 |
| 11111110 | +4 |
| 111111110 | −4 |
| 1111111110 | +5 |
| 11111111110 | −5 |

Accordingly, the Y signal having five bits/pel can be compressed in average to 2.4 bits/pel with respect to a portrait described by 128×128 picture elements (pel).

On the other hand, the I and Q signals describe the hue. A high reproducibility is not required of the hue because the visual sensitivity of the human eye is relatively low. Hence, the I and Q signals are thinned out to one picture element for every 2×2 picture elements in the thin-out circuit 27. The thinned out I and Q signals are subjected to the AADM in the advanced adaptive delta modulators 28 and 29 and encoded. As a result, the I and Q signals are compressed to 0.25 bit/pel.

In the expansion part 17b, the decoder 30 decodes the encoded DPCM Y signal, while the decoders 31 and 32 decode the respective thinned out AADM I and Q signals. The interpolator 33 interpolates the thinned out I and Q signals as described before in conjunction with FIG. 4. Hence, the compressed and encoded YIQ signals are expanded and decoded into the YIQ signals.

The methods of thinning out and interpolating the I and Q signals are not limited to those described in conjunction with FIG. 4, and any appropriate methods may be employed.

Therefore, with respect to the portrait described by 128×128 picture elements, the RGB signals amounting to a total of twelve (4 bits×3) bits/pel can be compressed in average to 2.9 (2.4+0.25×2) bits/pel by use of the AADM. As for the picture quality of the reproduced color still picture, the noise in the Y signal is small and is extremely satisfactory for use in the video phone or the like.

Figure 16:
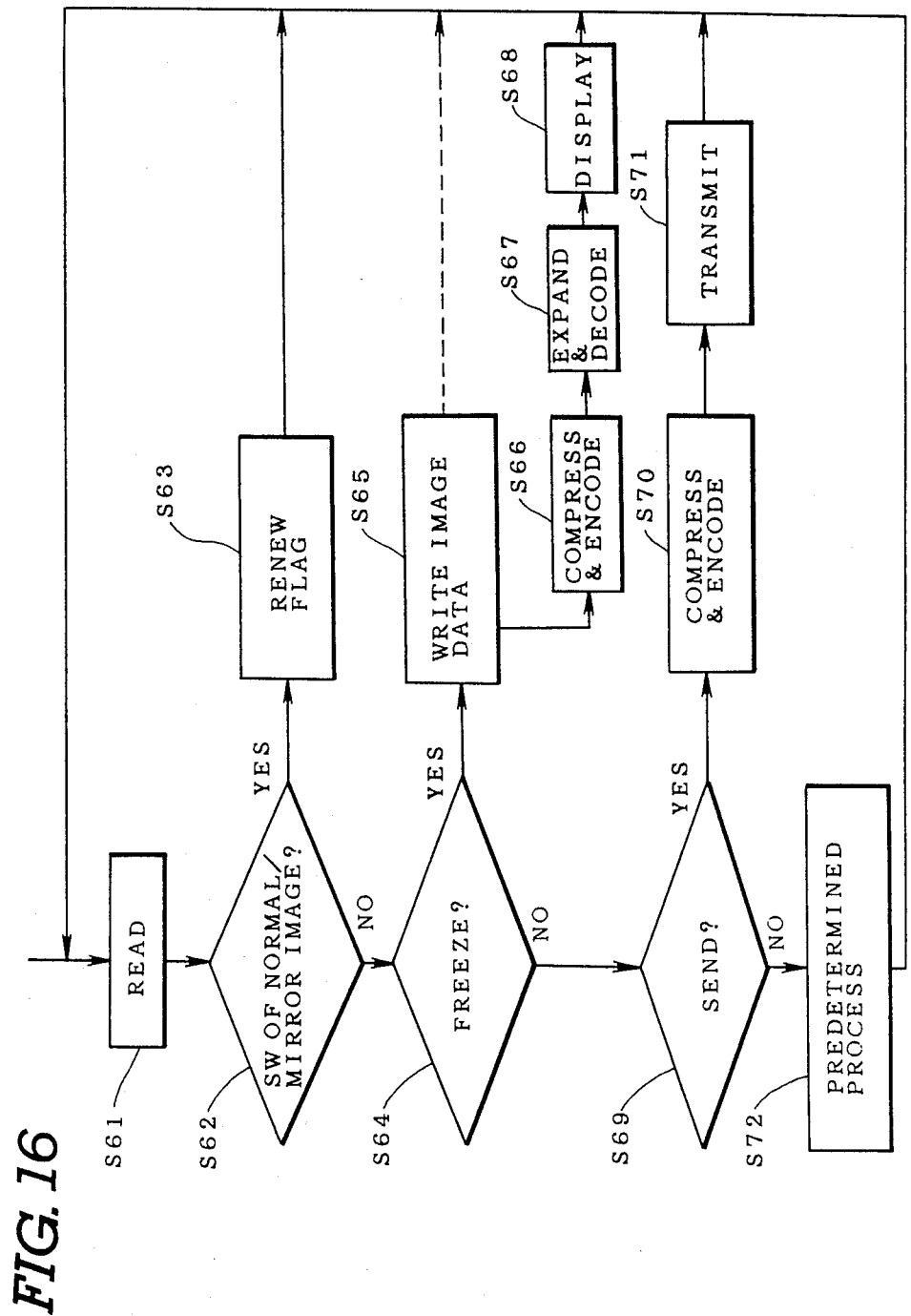
FIG. 16 is a flow chart for explaining a modification of the image transmission procedure applicable to the embodiments.

Next, a description will be given on a modification of the image transmission procedure applicable to the described embodiments, by referring to FIG. 16. FIG. 16 generally shows an essential part of the modification of the image transmission procedure carried out by the system controller 22. A step S61 reads the data entered from the keyboard 21. A step S62 discriminates whether or not a normal/mirror image key among the function keys 21b of the keyboard 21 is manipulated. When the normal/mirror image key is manipulated in a state where the LCD panel 15 is displaying a normal image, the image is inverted to display a mirror image thereof. On the other hand, when the normal/mirror image key is manipulated in a state where the LCD panel 15 is displaying a mirror image, the image is inverted to display a normal image thereof. When the discrimination result in the step S62 is YES, a step S63 renews a normal/mirror image flag depending on the state in which the normal/mirror image key is manipulated. For example, the normal/mirror image flag is set when the normal/mirror image key is manipulated in the state where the normal image is displayed on the LCD panel 15, and is reset when the normal/mirror image key is manipulated in the state where the mirror image is displayed on the LCD panel 15. The process returns to the step S61 after the step S63.

When the discrimination result in the step S62 becomes NO, a step S64 discriminates whether or not the freeze key of the keyboard 21 is manipulated. When the discrimination result in the step S64 is YES, a step S65 writes the image data into the video memory 13 in a predetermined sequence dependent on the value of the normal/mirror image flag. The predetermined sequence in which the image data is written into the video memory 13 determines the image displayed on the LCD panel 15, that is, whether the normal or mirror image is displayed. Then, a step S66 compresses and encodes within the video compression and expansion circuit 17 the image data stored in the video memory 13, and a step S67 expands and decodes the compressed image data within the video compression and expansion circuit 17. A step S68 displays the expanded and decoded image data on the LCD panel 15 through the video memory 13 and the video signal output circuit 15. The process returns to the step S61 after the step S68.

It is of course possible to determine whether the normal or mirror image is displayed on the LCD panel 15, by changing the sequence in which the stored image data is read out from the video memory 13 for compression in the video compression and expansion circuit 17.

In the case where the simulation of the image to be transmitted is unnecessary, the steps S66 through S68 can be omitted. In this case, the process returns to the step S61 after the step S65 as indicated by a phantom line.

When the discrimination result in the step S64 becomes NO, a step S69 discriminates whether or not the send key of the keyboard 21 is manipulated. A step S70 compresses and encodes the image data stored in the video memory 13 when the discrimination result in the step S70 is YES. A step S71 transmits the compressed image data as the voice frequency signal through the modem line control circuit 18, and the process returns to the step S61. On the other hand, when the discrimination result in the step S69 is NO, a step S72 carries out predetermined processes depending on the needs before returning the process to the step S61.

The function of selectively displaying the mirror image on the LCD panel 15 is very useful in that the user can check his pose on the mirror image. Usually, people attend to their personal appearance by looking at a mirror image on a mirror and are not used to seeing a normal image. But according to the present modification, it is possible to selectively display the normal or mirror image depending on the needs.

Figure 17A:
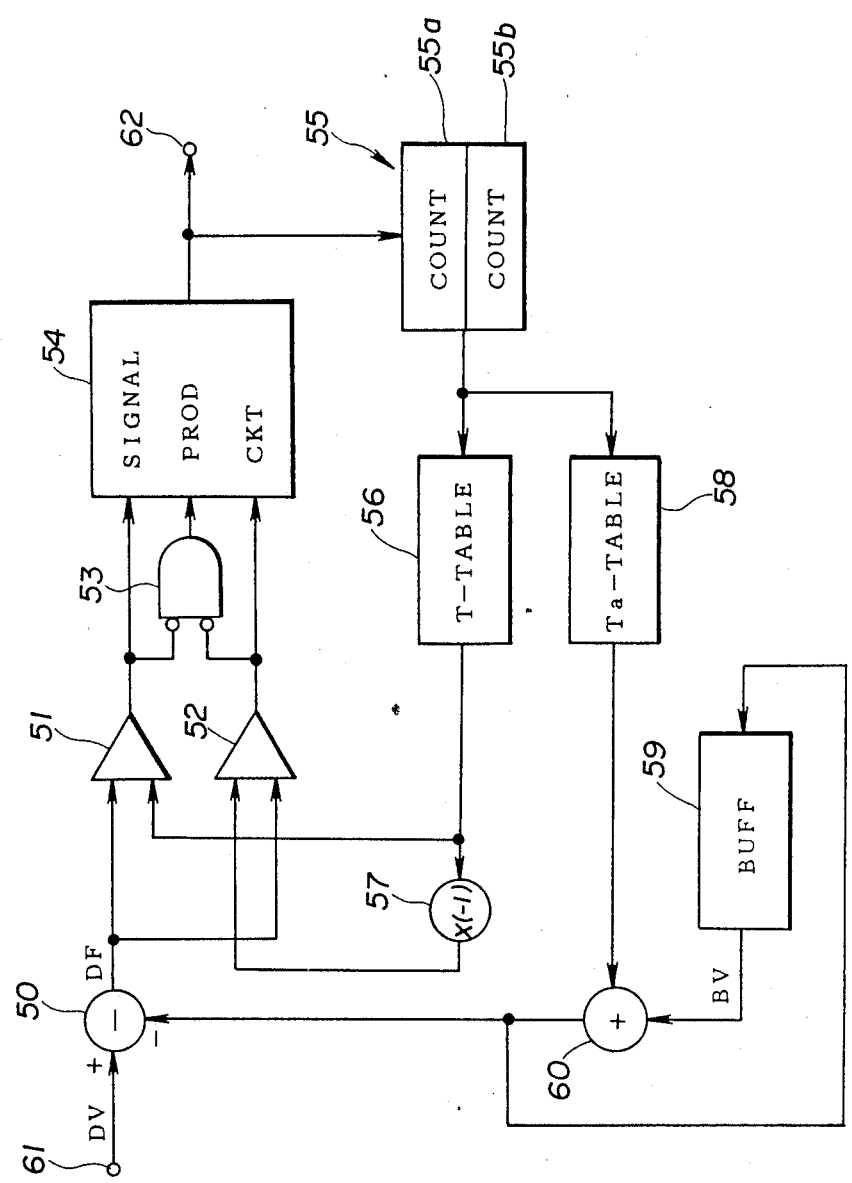
FIGS. 17A and 17B are system block diagrams respectively showing embodiments of an advanced adaptive delta modulator and a demodulator of the compression and expansion circuit.
Figure 17B:
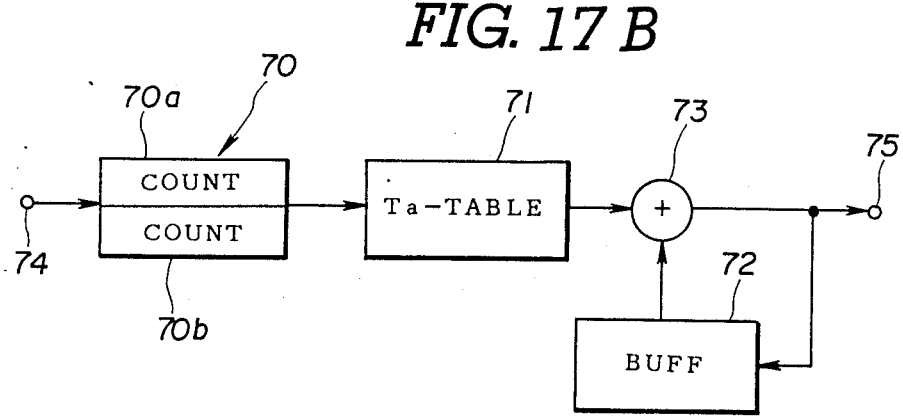

Next, a description will be given on embodiments of the advanced adaptive delta modulator and the demodulator of the compression and expansion circuit. FIG. 17A shows an embodiment of the advanced adaptive delta modulator, and FIG. 17B shows an embodiment of the demodulator. The advanced adaptive delta modulator and the demodulator are applicable to each of the embodiments of the image transmission system described heretofore.

In FIG. 17A, the advanced adaptive delta modulator comprises a subtracting circuit 50, comparators 51 and 52, an AND circuit 53, a signal producing circuit 54, a counter part 55 made up of counters 55a and 55b, a T-table 56 which prestores predetermined threshold values T, a multiplier 57, a Ta-table 58 which prestores predetermined threshold values Ta, a density buffer (accumulator) 59, and an adder 60. For example, in the case of the advanced adaptive delta modulator 28 shown in FIG. 3, the thinned out I signal (input density value) is supplied to the subtracting circuit 50 through an input terminal 61.

The subtracting circuit 50 subtracts from the input density value DV an output buffer value BV of the density buffer 59 obtained through the adder 60. A resulting difference value DF ($DF=DV-BV$) is applied to an input terminal of the comparator 51 and to an input terminal of the comparator 52. A predetermined threshold value T read out from the T-table 56 is supplied to the other input terminal of the comparator 51 on one hand, while the predetermined threshold value T from the T-table 56 is multiplied by "−1" in the multiplier 57 and is applied to the other input terminal of the comparator 52 on the other. Output signals of the comparators 51 and 52 are supplied to the signal producing circuit 54. The output signals of the comparators 51 and 52 are also supplied to the AND circuit 53, and an output signal of the AND circuit 53 is supplied to the signal producing circuit 54.

For example, the comparator 51 outputs a high-level signal (logic value "1") when the difference value DF is greater than the predetermined threshold value T, and the comparator 52 outputs a high-level signal when the difference value DF is less than −T. On the other hand, the AND circuit 53 outputs a high-level signal when the difference value DF is less than or equal to T and is greater than or equal to −T. The signal producing circuit 54 outputs a high-level signal (logic value "1") when the output signal level of the comparator 51 is high, outputs a low-level signal (logic value "0") when the output signal level of the comparator 52 is high, and outputs a signal having a level which is complementary to the output signal level of the signal producing circuit 54 immediately before the high-level signal is received from the AND circuit 53. For example, when the output signal level of the signal producing circuit 54 is high (logic value "1") immediately before the high-level signal is received from the AND circuit 53, the signal producing circuit 54 outputs a low-level signal (logic value "0") after receipt of the high-level signal from the AND circuit 53. The output signal of the signal producing circuit 54 is outputted through an output terminal 62 as the thinned out AADM I signal, for example.

The output signal of the signal producing circuit 54 is also supplied to the counter part 55. The counter 55a counts the number of low-level signals while the counter 55b counts the number of high-level signals. When the high-level signal is received from the signal producing circuit 54, the counter 55a is cleared while the counter 55b counts the high-level signal. On the other hand, when the low-level signal is received from the signal producing circuit 54, the counter 55b is cleared while the counter 55a counts the low-level signal. An output signal of the counter part 55 indicative of the counted values in the counters 55a and 55b is supplied to the T-table 56 and the Ta-table 58 to read therefrom the corresponding predetermined threshold values T and Ta.

The predetermined threshold value T read out from the T-table 56 is supplied to the multiplier 57. On the other hand, the predetermined threshold value Ta read out from the Ta-table 58 is supplied to the adder 60. The predetermined threshold value Ta is added to the output buffer value BV of the density buffer 59. The output of the adder 60 is supplied to the subtracting circuit 50 and is also fed back to the density buffer 59.

The following Table 2 shows an embodiment of the predetermined threshold values T and Ta respectively stored in the T-table 56 and the Ta-table 58, in correspondence with the counted values of the counters 55a and 55b constituting the counter part 55. As may be seen from Table 2, the predetermined threshold value Ta is "0" when the counted values of the counters 55a and 55b respectively are "0" and "1" or vice versa. This means that the output buffer value BV of the density buffer 59 is supplied as it is through the adder 60 to the subtracting circuit 50 when the output signal level of the AND circuit 53 is high, that is, when the difference value DF is less than or equal to T and is greater than or equal to −T. The positive predetermined threshold value Ta is added to the output buffer value BV of the density buffer 59 when the counted value of the counter 55a is "0" and the counted value of the counter 55b is "2" or more. The negative predetermined threshold value Ta is added to the output buffer value BV of the density buffer 59 when the counted value of the counter 55b is zero and the counted value of the counter 55a is "2" or more.

TABLE 2

| State | Counter 55a | Counter 55b | T  | Ta |
|-------|-------------|-------------|----|----|
| A     | 0           | 3 or over   | +3 | +5 |
| B     | 0           | 2           | +3 | +1 |
| C     | 0           | 1           | +1 | 0  |
| D     | 1           | 0           | −1 | 0  |
| E     | 2           | 0           | −3 | −1 |
| F     | 3 or over   | 0           | −3 | −5 |

The following Tables 3A and 3B show an example of the AADM carried out in the present embodiment by use of the T-table 56 and the Ta-table 58 which prestore the predetermined threshold values T and Ta shown in Table 2. In Tables 3A and 3B, the "input number" refers to the input data number, and "counter input" refers to the input signal of the counter part 55. In addition, "BV after trans/rec" refers to the output buffer value BV after the signal transmission/reception.

TABLE 3A

| Input Number    | Initial State | 1  | 2  | 3  | 4  | 5  |
|-----------------|---------------|----|----|----|----|----|
| Input Density DV|               | 30 | 29 | 28 | 28 | 29 | 30 |
| Buffer Value BV | 29            | 29 | 29 | 28 | 28 | 29 |
| Difference DF   |               | 1  | 0  | −1 | 0  | 1  | 1  |
| Counter Input   |               | 1  | 0  | 0  | 1  | 1  | 0  |
| State           |               | C  | D  | E  | C  | B  | D  |
| BV After Trans/Rec |            | 29 | 29 | 28 | 28 | 29 | 29 |

TABLE 3B

| Input Number | 6  | 7  | 8  | 9  | 10 | 11 | 12 | 13 | 14 | 15 |
|--------------|----|----|----|----|----|----|----|----|----|----|
| DV           | 30 | 29 | 21 | 22 | 22 | 22 | 22 | 22 | 22 | 22 |
| BV           | 29 | 29 | 29 | 28 | 23 | 23 | 23 | 22 | 22 | 22 |
| DF           | 1  | 0  | −8 | −6 | −1 | −1 | −1 | 0  | 0  | 0  |
| Counter Input| 1  | 0  | 0  | 0  | 1  | 0  | 0  | 1  | 0  | 1  |
| State        | C  | D  | E  | F  | C  | D  | E  | C  | D  | C  |
| BV After Trans/Rec | 29 | 29 | 28 | 23 | 23 | 23 | 22 | 22 | 22 | 22 |

In Tables 3A and 3B, it is assumed for convenience' sake that in the initial state the output buffer value BV of the density buffer 59 is "29" and the counted values of the counters 55a and 55b are "0 and "1", respectively. However, it is of course possible to set the initial output buffer value BV of the density buffer 59 to "0" and set the initial counted values of the counters 55a and 55b to "0" and "2", respectively, at the beginning of each line of the image.

Figure 18:
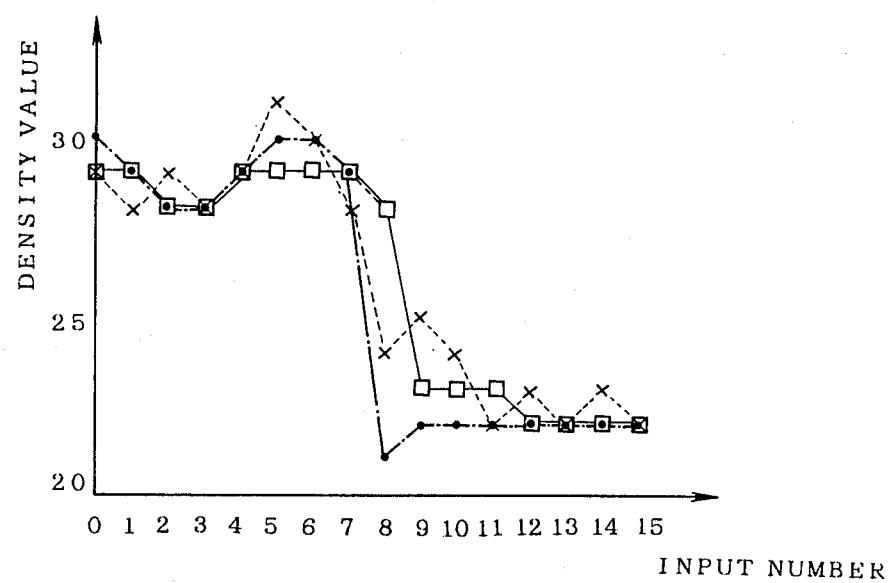
FIG. 18 shows the input density value and the demodulated density value which is obtained by demodulating the advanced adaptive delta modulated density data with respect to the input data number.

FIG. 18 shows the input density value and the demodulated density value which is obtained by demodulating the AADM density data, with respect to the input data number. In FIG. 18, the input density value is indicated by a one-dot chain line, and the demodulated density value is indicated by a solid line.

With respect to the input number "1", the input density value DV is "29" and the output buffer value BV of the density buffer 59 is "29". Hence, DV−BV=29−29=0, and the input of the counter part 55 is inverted from the immediately preceding logic value "1", that is, inverted from the initial state to "0". Accordingly, this case corresponds to the state D and the predetermined threshold value Ta of "0" is read out from the Ta-table 58. As a result, the output buffer value BV after the signal transmission/reception remains to be "29".

With respect to the input number "2", the input density value DV is "28" and the output buffer value BV of the density buffer 59 is "29". Hence DV−BV=28−29=−1, and the input of the counter part 55 is "0". Hence, this case corresponds to the state E and the predetermined threshold value Ta of "−1" is read out from the Ta-table 58. As a result, the output buffer value BV after the signal transmission/reception is added with "−1" and becomes "28".

The output buffer value BV of the density buffer 59 is controlled similarly for the input numbers "3" through "7".

With respect to the input number "8", the input density value DV is "21" and the output buffer value BV of the density buffer 59 is "29". Hence, DV−BV=21−29=−8, and the input of the counter part 55 is "0". Accordingly, this case corresponds to the state E and the predetermined threshold value Ta of "−1" is read out from the Ta-table 58. As a result, the output buffer value BV after the signal transmission/reception is added with "−1" and becomes "28".

The response to the flat portion, that is, the input numbers "9" through "15", becomes as follows.

With respect to the input number "9", the input density value DV is "22" and the output buffer value BV of the density buffer 59 is "28". Hence, DV<BV=22−28=−6, and the input of the counter part 55 is "0". Accordingly, this case corresponds to the state F and the predetermined threshold value Ta of "−5" is read out from the Ta-table 58. As a result, the output buffer value BV after the signal transmission/reception is added with "−5" and becomes "23".

With respect to the input number "10", the input density value DV is "22" and the output buffer value BV of the density buffer 59 is "23". Hence, DV−BV=22−23=−1, and the input of the counter part 55 is "1". Accordingly, this case corresponds to the state C and the predetermined threshold value Ta of "0" is read out from the Ta-table 58. As a result, the output buffer value BV after the signal transmission/reception remains to be "23".

With respect to the input number "11", the input density value DV is "22" and the output buffer value BV of the density buffer 59 is "23". Hence, DV−BV=22−23=−1, and the input of the counter part 55 is "0". Accordingly, this case corresponds to the state D and the predetermined threshold value Ta of "0" is read out from the Ta-table 58. As a result, the output buffer value BV after the signal transmission/reception remains to be "23".

With respect to the input number "12", the input density value DV is "22" and the output buffer value BV of the density buffer 59 is "23". Hence, DV−BV=22−23=−1, and the input of the counter part 55 is "0". Accordingly, this case corresponds to the state E and the predetermined threshold value Ta of "−1" is read out from the Ta-table 58. As a result, the output buffer value BV after the signal transmission/reception is added with "−1" and becomes "22".

With respect to the input number "13", the input density value DV is "22" and the output buffer value BV of the density buffer 59 is "22". Hence, DV−BV=22−22=0, and the input of the counter part 55 is "1". Accordingly, this case corresponds to the state C and the predetermined threshold value Ta of "0" is read out from the Ta-table 58. As a result, the output buffer value BV after the signal transmission/reception remains to be "22".

With respect to the input number "14", the input density value DV is "22" and the output buffer value BV of the density buffer 59 is "22". Hence, DV−BV=22−22=0, and the input of the counter part 55 is "0". Accordingly, this case corresponds to the state D and the predetermined threshold value Ta of "0" is read out from the Ta-table 58. As a result, the output buffer value BV after the signal transmission/reception remains to be "22".

Thereafter, as long as the input density value DV remains to be "22", the same processes for the input numbers "13" and "14"are repeated, thereby repeating the states C, D, C, D, ... As a result, the output buffer value BV after the signal transmission/reception remains to be "22".

For comparison purposes, the demodulated density value which is obtained by demodulating the adaptive delta modulated density data is indicated by a phantom line in FIG. 18 with respect to the input data number. As may be seen by comparing the density values indicated by the solid line and the density values indicated by the phantom line in FIG. 18, the present embodiment provides a considerably improved modulation technique compared to the conventional adaptive delta modulation and demodulation technique which does not have the quantization step size of "0", especially at the flat portion corresponding to the input numbers "12" through "15". The following Table 4 shows an example of the predetermined threshold values T and Ta which would be respectively stored in the T-table 56 and the Ta-table 58, in correspondence with the counted values of the counters 55a and 55b constituting the counter part 55 for the conventional adaptive delta modulation, and the following Tables 5A and 5B show an example of the adaptive delta modulation carried out by use of the T-table 56 and the Ta-table 58 which prestore the predetermined threshold values T and Ta shown in Table 4.

TABLE 4

| State | Counter 55a | Counter 55b | T | Ta |
|---|---|---|---|---|
| A | 0 | 3 or over | +3 | +4 |
| B | 0 | 2 | +3 | +2 |
| C | 0 | 1 | +1 | +1 |
| D | 1 | 0 | −1 | −1 |
| E | 2 | 0 | −3 | −2 |
| F | 3 or over | 0 | −3 | −4 |

TABLE 5A

| Input Number | Initial State | 1 | 2 | 3 | 4 | 5 |
|---|---|---|---|---|---|---|
| Input Density DV | 30 | 29 | 28 | 28 | 29 | 30 |
| Buffer Value BV | 29 | 29 | 28 | 29 | 28 | 29 |
| Difference DF | 1 | 0 | 0 | −1 | 1 | 1 |
| Counter Input | 1 | 0 | 1 | 0 | 1 | 1 |
| State | C | D | C | D | C | B |
| BV After Trans/Rec | 29 | 28 | 29 | 28 | 29 | 31 |

TABLE 5B

| Input Number | 6 | 7 | 8 | 9 | 10 | 11 | 12 | 13 | 14 | 15 |
|---|---|---|---|---|---|---|---|---|---|---|
| DV | 30 | 29 | 21 | 22 | 22 | 22 | 22 | 22 | 22 | 22 |
| BV | 31 | 30 | 28 | 24 | 25 | 24 | 22 | 23 | 22 | 23 |
| DF | −1 | −1 | −7 | −2 | −3 | −2 | 0 | −1 | 0 | −1 |
| Counter Input | 0 | 0 | 0 | 1 | 0 | 0 | 1 | 0 | 1 | 0 |
| State | D | E | F | C | D | E | C | D | C | D |
| BV After Trans/Rec | 30 | 28 | 24 | 25 | 24 | 22 | 23 | 22 | 23 | 22 |

Although the present embodiment uses the multiplier 57, it is possible to omit the multiplier 57 when the T-table 56 is designed to also prestore complementary values −T of the predetermined threshold values T shown in Table 2. In this case, the predetermined threshold value T is supplied to the comparator 51 while the complementary value −T is supplied to the comparator 52.

In FIG. 17B, the demodulator comprises a counter part 70 made up of counters 70a and 70b, a Ta-table 71, a density buffer (accumulator) 72, and an adder 73. Similarly as in the case of the counter part 55 in the advanced adaptive delta modulator, the counter 70a counts the number of low-level signals while the counter 70b counts the number of high-level signals. The Ta-table 71 prestores predetermined threshold values Ta.

For example, in the case of the demodulator 31 shown in FIG. 3, the thinned out AADM I signal is supplied to the counter part 70 through an input terminal 74. When a high-level signal is received at the input terminal 73, the counter 70a is cleared while the counter 70b counts the high-level signal. On the other hand, when the low-level signal is received at the input terminal 74, the counter 70b is cleared while the counter 70a counts the low-level signal. An output signal of the counter part 70 indicative of the counted values in the counters 70a and 70b is supplied to the Ta-table 71 to read the corresponding predetermined threshold value Ta therefrom.

A description on the contents of the Ta-table 71 will be omitted since it is readily apparent from the description given heretofore.

The predetermined threshold value Ta read out from the Ta-table 71 is supplied to the adder 73. The predetermined threshold value Ta is added to an output buffer value of the density buffer 72, and an output density value of the adder 73 is outputted through an output terminal 75. Hence, a process complementary to that carried out in the advanced adaptive delta modulator shown in FIG. 17A is carried out in the demodulator shown in FIG. 17B. In the case of the compression and expansion circuit shown in FIG. 3, the output density value from the output terminal 75 is supplied to the interpolator 23.

In the embodiments, the video memory stores (expanded) digital image data from the video compression and expansion circuit in the image receiving mode, but the video memory may store compressed image data from the modem line control circuit. In this case, the video compression and expansion circuit expands the compressed image data read out from the video memory and then stores the (expanded) digital image data into the video memory for display on the LCD panel through the video output circuit.

Further, the present invention is not limited to these embodiments, but various variations and modifications may be made without departing from the scope of the present invention.

What is claimed is:

1. A video phone comprising:
   input means for sequentially entering image data;
   digitizing means for digitizing said input image data into digital image data;
   memory means for sequentially storing said digital image data;
   image signal producing means for producing an output image signal based on said digital image data sequentially read out from said memory means;
   display means for sequentially displaying an image described by said output image signal;
   compression and expansion means for compressing said digital image data read out from said memory means into compressed image data in an image transmitting mode and for expanding compressed image data into digital image data in an image receiving mode;
   telephone means having telephone functions for transmitting and receiving a call;
   line control means coupled to a public analog telephone line for selectively coupling one of said compression and expansion means and said telephone means to said public analog telephone line, said line control means including modem means for modulating said compressed image data from said compression and expansion means into a voice frequency signal in the image transmitting mode and for demodulating a voice frequency signal received through said public analog telephone line into compressed image data in the image receiving mode; and
   control means for controlling at least said memory means and said compression and expansion means,
   said control means having means for freezing the image displayed on said display means at an arbitrary time by stopping the sequential storage of said digital image data into said memory means so that said compressed image data related to a frozen image is read out from said memory means and supplied simultaneously to said image signal producing means and said compression and expansion means in the image transmitting mode,
   said control means controlling said memory means and said compression and expansion means in the image receiving mode so that said compressed image data related to said voice frequency signal received through said public analog telephone line is first stored in said memory means and read out therefrom to be expanded in said compression and expansion means into digital image data which is then stored in said memory means, said digital image data being read out from said memory means to be supplied to said image signal producing means.

2. A video phone comprising:
   input means for sequentially entering image data;
   digitizing means for digitizing said input image data into digital image data, said digitizing means comprising means for producing three kinds of digital primary color signals as said digital image data;
   memory means for sequentially storing said digital image data;
   image signal producing means for producing an output image signal based on said digital image data sequentially read out from said memory means;
   display means for sequentially displaying an image described by said output image signal;
   compression and expansion means for compressing said digital image data read out from said memory means into compressed image data in an image transmitting mode and for expanding compressed image data into digital image data in an image receiving mode, said compression and expansion means comprising a compression part and an expansion part;
   telephone means having telephone functions for transmitting and receiving a call;
   line control means coupled to a public analog telephone line for selectively coupling one of said compression and expansion means and said telephone means to said public analog telephone line, said line control means including modem means for modulating said compressed image data from said compression and expansion means into a voice frequency signal in the image transmitting mode and for demodulating a voice frequency signal received through said public analog telephone line into compressed image data in the image receiving mode; and
   control means for controlling at least said memory means and said compression and expansion means,
   said control means having means for freezing the image displayed on said display means at an arbitrary time by stopping the sequential storage of said digital image data into said memory means so that said compressed image data related to a frozen image is read out from said memory means and supplied simultaneously to said image signal producing means and said compression and expansion means in the image transmitting mode,
   said control means controlling said compression and expansion means and said memory means in the image receiving mode so that said compressed image data related to said voice frequency signal received through said public analog telephone line is expanded into digital image data in said compression and expansion means and stored in said memory means and read out therefrom to be supplied to said image signal producing means,
   said compression part comprising first converting means for converting said digital primary color signals into a digital luminance signal and two kinds of digital color difference signals, a first modulator for modulating the digital luminance signal into a modulated digital luminance signal, and a second modulator for independently modulating the two kinds of digital color difference signals into two kinds of modulated digital color difference signals, said second modulator modulating at least one of the two kinds of digital color difference signals according to a second modulation system which is different from a first modulation system which is used by said first modulator,
   said expansion part comprising a first demodulator for demodulating said modulated digital luminance signal into said digital luminance signal, a second demodulator for demodulating said two kinds of modulated digital color difference signals into said two kinds of digital color difference signals, and second converting means for converting said digital luminance signal and said two kinds of digital color difference signals into three kinds of reproduced digital primary color signals.

3. A video phone as claimed in claim 1 in which said control means controls said first and second converting means in a simulation mode to simulate on said display means a display of said input image data as viewed on a receiving end of said public analog telephone line, said control means controlling said first converting means to store said digital luminance signal and said two kinds of digital color difference signals in said memory means and controlling said second converting means to read out said digital luminance signal and said two kinds of digital color difference signals and to store said reproduced digital primary color signals in said memory means, said reproduced digital primary color signals being read out from said memory means and supplied to said image signal producing means in said simulation mode.

4. A video phone as claimed in claim 1 which further comprises first means for controlling one of a write-in sequence and a read-out sequence of said memory means, and second means for selecting one of a normal mode and a mirror mode and controlling said first means responsive to a selection so as to display a selected one of a normal image and a mirror image of said input image data.

5. A video phone as claimed in claim 1 in which said control means controls said compression and expansion means in a simulation mode to simulate on said display means a display of said input image data as viewed on a receiving end of said public analog telephone line, said control means controlling said compression and expansion means to store said reproduced digital primary color signals in said memory means, said reproduced digital primary color signals being read out from said memory means and supplied to said image signal producing means in said simulation mode.

6. A video phone as claimed in claim 1 in which said compression and expansion means further comprises thin-out means in said compression part and interpolator means in said expansion part, said thin-out means thinning out said two kinds of digital color difference signals before modulation by said modulator means, said interpolator means interpolating said two kinds of demodulated digital color difference signals before conversion in said second converting means.

7. A video phone as claimed in claim 1 in which said input means comprises a video camera for picking up an image.

8. A video phone as claimed in claim 1 in which said input means outputs said input image data in conformance with a standardized color television system, and said image signal producing means produces said image signal in conformance with a standardized color television system.

9. A video phone as claimed in claim 1 in which said display means comprises a liquid crystal display panel.

10. A video phone as claimed in claim 1 in which said control means comprises a keyboard for entering data and instructions.

11. A video phone as claimed in claim 1 which further comprises enabling and disabling means for enabling and disabling a monitoring of an image displayed on said display means.

12. A video phone as claimed in claim 11 in which said enabling and disabling means comprises a slidable cover, said slidable cover having first and second positions respectively for exposing and covering said display means so as to enable and disable monitoring of the image displayed on said display means.

13. A video phone comprising:
input means for sequentially entering image data;
digitizing means for digitizing said input image data into digital image data;
memory means for sequentially storing said digital image data;
image signal producing means for producing an output image signal based on said digital image data sequentially read out from said memory means;
display means for sequentially displaying an image described by said output image signal;
compression and expansion means for compressing said digital image data read out from said memory means into compressed image data in an image transmitting mode and for expanding compressed image data into digital image data in an image receiving mode;
telephone means having telephone functions for transmitting and receiving a call;
line control means coupled to a public analog telephone line for selectively coupling one of said compression and expansion means and said telephone means to said public analog telephone line, said line control means including modem means for modulating said compressed image data from said compression and expansion means into a voice frequency signal in the image transmitting mode and for demodulating a voice frequency signal received through said public analog telephone line into compressed image data in the image receiving mode;
control means for controlling at least said memory means and said compression and expansion means; and
enabling and disabling means for enabling and disabling a monitoring of an image displayed on said display means,
said control means having means for freezing the image displayed on said display means at an arbitrary time by stopping the sequential storage of said digital image data into said memory means so that said compressed image data related to a frozen image is read out from said memory means and supplied simultaneously to said image signal producing means and said compression and expansion means in the image transmitting mode,
said control means controlling said compression and expansion means and said memory means in the image receiving mode so that said compressed image data related to said voice frequency signal received through said public analog telephone line is expanded into digital image data in said compression and expansion means and stored in said memory means and read out therefrom to be supplied to said image signal producing means,
said enabling and disabling means comprising means for electrically enabling and disabling the display of the image on said display by controlling said line control means.

14. A video phone as claimed in claim 13 which further comprises means for manually operating said enabling and disabling means.

15. A video phone as claimed in claim 14 in which said means for manually operating said enabling and disabling means disables the display of the image on said display means when manipulated.

16. A video phone as claimed in claim 14 in which said means for manually operating said enabling and disabling means enables the display of the image on said display means when manipulated.

17. A video phone as claimed in claim 13 which further comprises register means for registering predetermined codes, and means for automatically enabling the display of the image on said display means when one of said codes is received prior to a reception of said voice frequency signal through said public analog telephone line and automatically disabling the display of the image on said display means when none of said codes is received prior to the reception of said voice frequency signal through said public analog telephone line.

18. A video phone as claimed in claim 17 in which said codes are telephone numbers of callers from which said video phone is permitted to receive an image data to be displayed on said display means.

* * * * *